United States Patent
Wilkosz et al.

(10) Patent No.: US 11,380,099 B2
(45) Date of Patent: Jul. 5, 2022

(54) DEVICE, SYSTEM AND METHOD FOR CONTROLLING A COMMUNICATION DEVICE TO PROVIDE NOTIFICATIONS OF SUCCESSFUL DOCUMENTATION OF EVENTS

(71) Applicant: MOTOROLA SOLUTIONS, INC., Chicago, IL (US)

(72) Inventors: Pawel Wilkosz, Myslenica (PL); Pawel Jedrzejewski, Cracow (PL); Mateusz Gazdziak, Borowa (PL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 28 days.

(21) Appl. No.: 16/979,009

(22) PCT Filed: Mar. 16, 2018

(86) PCT No.: PCT/PL2018/050011
§ 371 (c)(1),
(2) Date: Sep. 8, 2020

(87) PCT Pub. No.: WO2019/177470
PCT Pub. Date: Sep. 19, 2019

(65) Prior Publication Data
US 2021/0374414 A1  Dec. 2, 2021

(51) Int. Cl.
*G06V 20/40* (2022.01)
*G06V 40/16* (2022.01)

(52) U.S. Cl.
CPC .............. *G06V 20/41* (2022.01); *G06V 20/47* (2022.01); *G06V 40/161* (2022.01)

(58) Field of Classification Search
CPC ........... G06K 9/00718; G06K 9/00228; G06K 9/00751
(Continued)

(56) References Cited

U.S. PATENT DOCUMENTS 7,406,423 B2  7/2008  Kumhyr
10,217,287 B2  2/2019  Lim et al.
(Continued)

FOREIGN PATENT DOCUMENTS

WO  199708896 A1  3/1997
WO  2016010442 A1  1/2016

OTHER PUBLICATIONS

International Search Report dated Jul. 12, 2018, in corresponding PCT application No. PCT/PL2018/050011, filed Mar. 16, 2018.

*Primary Examiner* — Amandeep Saini
(74) *Attorney, Agent, or Firm* — Perry + Currier, Inc.

(57) ABSTRACT

A device, system and method for controlling a communication device to provide notifications of successful documentation of events is provided. The device receives a type of a recognized event occurring at a location of an edge device. The device determines, based on the type of the recognized event, one or more multimedia data types for collection to document the recognized event. The device causes the edge device to collect multimedia data of the one or more multimedia data types. The device receives an indication that the multimedia data has been stored successfully. The device determines whether the multimedia data has successfully documented the recognized event. When the multimedia data has successfully documented the recognized event, the device controls the edge device to provide a notification of successful documentation of the recognized event.

18 Claims, 10 Drawing Sheets

(58) Field of Classification Search
USPC .......................................................... 382/103
See application file for complete search history.

(56) References Cited

U.S. PATENT DOCUMENTS

| | | |
|---|---|---|
| 2005/0108074 A1 | 5/2005 | Bloechl et al. |
| 2005/0267770 A1 | 12/2005 | Banavar et al. |
| 2009/0225173 A1 | 9/2009 | Ogawa |
| 2012/0154582 A1 | 6/2012 | Johnson et al. |
| 2013/0111480 A1 | 5/2013 | Cox et al. |
| 2014/0244344 A1 | 8/2014 | Bilet et al. |
| 2015/0206419 A1* | 7/2015 | Johnson ............... G08B 25/009 340/936 |
| 2015/0381948 A1* | 12/2015 | Renkis .................... H04L 67/02 348/47 |
| 2017/0195386 A1 | 7/2017 | Nathan et al. |

\* cited by examiner

DEVICE, SYSTEM AND METHOD FOR CONTROLLING A COMMUNICATION DEVICE TO PROVIDE NOTIFICATIONS OF SUCCESSFUL DOCUMENTATION OF EVENTS

BACKGROUND OF THE INVENTION

Each year first responder service entities, such as police departments, face challenges in providing such services efficiently. For example, when a first responder encounters a person who is behaving in a manner that may require intervention, the first responder generally has a protocol to follow. Later, accusations may arise that the protocol was not followed, which can lead to personal injury and/or property claims, which in turn may waste technical resources in attempting to show that the protocol was in fact followed. For example, hours of video data may be stored, from body worn cameras, and the like, which must be reviewed for evidence of what occurred in the interaction. Furthermore, when such evidence cannot be found, costs can accumulate due to settlements.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
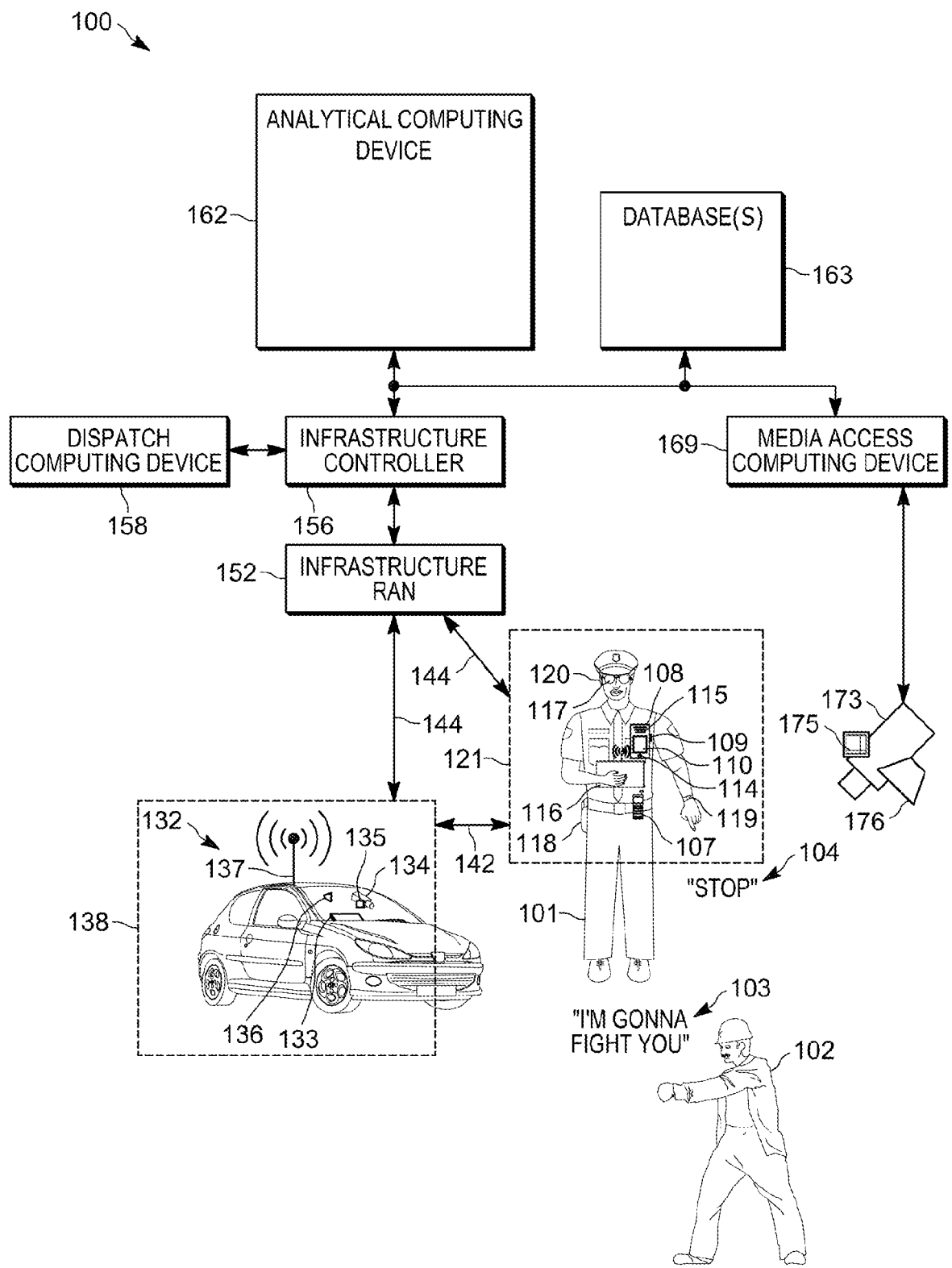
FIG. 1 is a system for controlling a communication device to provide notifications of successful documentation of events in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

An aspect of the specification provides a computing device comprising: a communications unit and a controller configured to: receive, using the communications unit, a type of a recognized event occurring at a location of an edge device; determine, based on the type of the recognized event, one or more multimedia data types for collection to document the recognized event; cause, using the communications unit, the edge device to collect multimedia data of the one or more multimedia data types; receive, using the communications unit, an indication that the multimedia data has been stored successfully; determine whether the multimedia data has successfully documented the recognized event; and when the multimedia data has successfully documented the recognized event, controlling, using the communications unit, the edge device to provide a notification of successful documentation of the recognized event.

Another aspect of the specification provides a method comprising: receiving, at one or more computing devices, a type of a recognized event occurring at a location of an edge device; determining, at the one or more computing devices, based on the type of the recognized event, one or more multimedia data types for collection to document the recognized event; causing, using the one or more computing devices, the edge device to collect multimedia data of the one or more multimedia data types; receiving, at the one or more computing devices, an indication that the multimedia data has been stored successfully; determining, at the one or more computing devices, whether the multimedia data has successfully documented the recognized event; and when the multimedia data has successfully documented the recognized event, controlling, using the one or more computing devices, the edge device to provide a notification of successful documentation of the recognized event.

Attention is directed to FIG. 1, which depicts a system 100 for controlling a communication device to provide notifications of successful documentation of events. For example, as depicted, the system 100 may provide a notification of a successful documentation of an event that occurs at a location where a responder 101, such as a police officer, is involved in an incident and/or an event involving a person 102. As depicted, the person 102 may be behaving erratically, for example, attempting to throw a punch and/or may be speaking erratically, for example by yelling a threat 103 at the responder 101 (e.g. I'm gonna fight you"). Hence, the responder 101 may be asking the person 102 to stop via an aural command 104 (e.g. "STOP"). Furthermore, the event may escalate, starting as a verbal assault, and the like, and escalating to at least an attempted physical interaction by the person 102 with the responder 101, for example as the person 102 attempts to throw a punch at the responder 101. As depicted, the responder 101 may further gesture towards the person 102, for example by pointing towards the person 102. Hence, in general, the responder 101 may be attempting to communicate with the person 102 as part of a public safety incident and/or public safety event, and the like, and may generally have a protocol to follow to subdue and/or arrest and/or handcuff the person 102.

As described herein, the system 100 is generally configured to document the event and furthermore control a communication device associated with the responder 101 to provide notifications of successful documentation of events. Such notifications may cause the responder 101 to take further action during the event to follow the protocol when the event is successfully documented in a manner that does not cause the public safety incident and/or event to escalate and which may hence reduce the use of technical resources in the system 100, for example, by preventing the responder 101 from using radios and the like to call in additional public safety resources as backup and/or to deal with the person 102 and/or to reduce the amount data collected to document the incident.

The system 100 is next described in further detail. As depicted, the system 100 includes a first set of devices that the responder 101 may wear. The set of devices may include one device, such as a primary battery-powered portable radio 107 or more than one device. Such devices may be referred to as edge devices as they are located not in the "cloud" but at the "edge" of a network and/or the "cloud. As such, the responder 101 may alternatively be referred to as an operator of an edge device. However other types of edge devices are within the scope of present embodiments. For example, an edge device may be a device which provides an entry point into a communication network and which may include, but is not limited to, phones, smartphones, radios, but also routers, routing switches, integrated access devices (IADs), multiplexers, and a variety of metropolitan area network (MAN) and wide area network (WAN) access devices.

Such devices may include the primary battery-powered portable radio 107 used for narrowband and/or broadband direct-mode or infrastructure communications, a battery-powered radio speaker microphone (RSM) video capture device 108 (which includes a push-to-talk (PTT) switch 109, a display screen 110 and a video camera 114 and a microphone 115 (which is assumed to be a component of a speaker/microphone assembly). As depicted, the first set of devices that the responder 101 may wear includes a laptop 116 which may include an integrated video camera and/or microphone and/or speaker and used for data applications such as incident support applications. As depicted the first set of devices that the responder 101 may wear includes smart glasses 117 (e.g. which may be virtual reality, augmented reality, or mixed reality glasses and which may include an integrated video camera and/or microphone and/or speaker), a sensor-enabled holster 118, and/or a biometric sensor wristband 119 and/or a headphone 120.

The portable radio 107, the RSM video capture device 108, the laptop 116, smart glasses 117, the sensor-enabled holster 118, and/or the biometric sensor wristband 119 and/or the headphone 120 may form a personal area network (PAN) 121 of the responder 101 via corresponding short-range PAN transceivers, which may be based on a Bluetooth™, Zigbee™ and/or WiFi, or other short-range wireless protocol having a transmission range on the order of meters, tens of meters, or hundreds of meters.

Although FIG. 1 illustrates only a single responder 101 with a respective first set of devices, in other embodiments, the responder 101 may include additional sets of same or similar devices, and additional persons and/or first responders may be present with respective additional sets of same or similar devices (wherein communication devices of the responder 101 and the additional users may form a talkgroup of related users).

The system 100 may also include a vehicle 132 associated with the responder 101 having an integrated mobile communication device 133, an associated vehicular video camera 134, and/or an associated microphone 135 (which may be a component of the video camera 134 or a component separate from the video camera 134), a speaker 136 and a coupled vehicular transceiver 137 which may form a vehicle area network (VAN) 138.

Although FIG. 1 illustrates only a single vehicle 132 with a single mobile communication device 133, respective single vehicular video camera 134 and/or microphone 135, and single coupled vehicular transceiver 137, in other embodiments, the vehicle 132 may include additional same or similar mobile communication devices, video cameras, microphones, speakers, and/or transceivers, and additional vehicles may be present with respective additional sets of mobile communication devices, video cameras, speakers, microphones, and/or transceivers.

Each of the portable radio 107, the RSM video capture device 108, the laptop 116, and/or the PAN 121 and the vehicular mobile communication device 133 and/or the VAN 138 may be configured for directly wirelessly communicating via direct-mode wireless link(s) 142, and/or may be configured for wirelessly communicating over respective wireless link(s) 144 via a wireless infrastructure radio access network (RAN) 152 (described in more detail below) and via corresponding transceiver circuits. These devices may be referred to as communication devices and are configured to receive inputs associated with the responder 101 and/or provide outputs to the responder 101 in addition to communicating information to and from other communication devices and the infrastructure RAN 152.

The portable radio 107, in particular, may be any communication device used for infrastructure RAN or direct-mode media (e.g., voice, audio, video, etc.) communication via a long-range wireless transmitter and/or transceiver that has a transmitter transmit range on the order of miles, e.g., 0.5-50 miles, or 3-20 miles (i.e., long-range in comparison to a short-range transmitter such as a Bluetooth™, Zigbee™, or NFC (near field communication) transmitter) with other communication devices and/or an infrastructure RAN. The long-range transmitter may implement a direct-mode, conventional, or trunked land mobile radio (LMR) standard or protocol such as European Telecommunications Standards Institute (ETSI) Digital Mobile Radio (DMR), a Project 25 (P25) standard defined by the Association of Public Safety Communications Officials International (APCO), Terrestrial Trunked Radio (TETRA), or other LMR radio protocols or standards. In other embodiments, the long-range transmitter may implement a Long-Term Evolution (LTE), LTE-Advance, or 5G protocol including multimedia broadcast multicast services (MBMS) or single site point-to-multipoint (SC-PTM) over which an open mobile alliance (OMA) push to talk (PTT) over cellular (OMA-PoC), a voice over IP (VoIP), an LTE Direct or LTE Device to Device, or a PTT over IP (PoIP) application may be implemented. In still further embodiments, the long-range transmitter may implement a Wi-Fi protocol, for example in accordance with an IEEE 802.11 standard (e.g., 802.11a, 802.11b, 802.11g) or a WiMAX (Worldwide Interoperability for Microwave Access) protocol, for example operating in accordance with an IEEE 802.16 standard.

In the example of FIG. 1, the portable radio 107 may form the hub of communication connectivity for the responder 101, through which other accessory devices, such as a biometric sensor (for example, the biometric sensor wristband 119), an activity tracker, a weapon status sensor (for example, the sensor-enabled holster 118), a heads-up-display (for example, the smart glasses 117), the RSM video capture device 108, and/or the laptop 116 and/or the headphone 120 may be communicatively coupled. In other words, the portable radio 107 may form the hub of the PAN 121.

In order to communicate with and exchange video, audio, and other media and communications with the RSM video capture device 108, laptop 116, and/or smart glasses 117 and/or headphone 120, the portable radio 107 may contain one or more physical electronic ports (such as a USB (Universal Serial Bus) port, an Ethernet port, an audio jack, etc.) for direct electronic coupling with the RSM video capture device 108, laptop 116, and/or smart glasses 117 and/or headphone 120. In some embodiments, the portable radio 107 may contain a short-range transmitter (i.e., short-range in comparison to the long-range transmitter such as a LMR or broadband transmitter) and/or transceiver for wirelessly coupling with the RSM video capture device 108, laptop 116, and/or smart glasses 117 and/or headphone 120. The short-range transmitter may be a Bluetooth™, Zigbee™, or NFC transmitter having a transmit range on the order of 0.01-100 meters, or 0.1-10 meters. In other embodiments, the RSM video capture device 108, the laptop 116, and/or the smart glasses 117 and/or headphone 120 may contain their own long-range transceivers and may communicate with one another and/or with the infrastructure RAN 152 or vehicular transceiver 137 directly without passing through portable radio 107.

The RSM video capture device 108 provides voice functionality features similar to a traditional RSM, including one or more of acting as a remote microphone (e.g. via the microphone 115) that is closer to the mouth of the responder 101, providing a remote speaker (e.g. integrated with the microphone 115) allowing playback of audio closer to the ear of the responder 101, and including the PTT switch 109 or other type of PTT input. The voice and/or audio recorded at the remote microphone 115 may be provided to the portable radio 107 for storage and/or analysis or for further transmission to other mobile communication devices or the infrastructure RAN 152, or may be directly transmitted by the RSM video capture device 108 to other communication devices or to the infrastructure RAN 152. The voice and/or audio played back at the remote speaker may be received from the portable radio 107 or received directly from one or more other communication devices or the infrastructure RAN 152. The RSM video capture device 108 may include the separate physical PTT switch 109 that functions, in cooperation with the portable radio 107 or on its own, to maintain the portable radio 107 and/or RSM video capture device 108 in a monitor only mode, and which switches the device(s) to a transmit-only mode (for half-duplex devices) or transmit and receive mode (for full-duplex devices) upon depression or activation of the PTT switch 109. The portable radio 107 and/or RSM video capture device 108 may form part of a group communications architecture that allows a single communication device to communicate with one or more group members (i.e., talkgroup members not shown in FIG. 1) associated with a particular group of devices at a same time.

Additional features may be provided at the RSM video capture device 108 as well. For example, as depicted, the display screen 110 may be provided for displaying images, video, and/or text to the responder 101 or to someone else. The display screen 110 may be, for example, a liquid crystal display (LCD) screen or an organic light emitting display (OLED) display screen, and the like. In some embodiments, a touch sensitive input interface may be incorporated into the display screen 110 as well, allowing the responder 101 to interact with content provided on the display screen 110. However, the display screen 110 may be optional. A soft PTT input may also be provided, for example, via such a touch interface.

The video camera 114 may also be provided at the RSM video capture device 108, integrating an ability to capture images and/or video and store the captured image data (for further analysis) or transmit the captured image data as an image or video stream to the portable radio 107 and/or to other communication devices or to the infrastructure RAN 152 directly. The video camera 114 and RSM remote microphone 115 may be used, for example, for capturing audio and/or video of a field-of-view associated with the responder 101, which may include the person 102 and/or surroundings of a person 102, storing the captured image and/or audio data for further analysis or transmitting the captured audio and/or video data as an audio and/or vide stream to the portable radio 107 and/or to other communication devices or to the infrastructure RAN 152 directly for further analysis. The microphone 115 of the RSM video capture device 108 may be an omni-directional or unidirectional microphone or array of omni-directional or unidirectional microphones that may configured for identifying a direction from which a captured sound emanated.

In some embodiments, the RSM video capture device 108 may be replaced with a more limited body worn camera that may include the video camera 114 and/or microphone 115 noted above for capturing audio and/or video, but may forego one or more of the features noted above that transform the body worn camera into a more full featured RSM, such as the separate physical PTT switch 109 and the display screen 110, remote microphone functionality for voice communications in cooperation with portable radio 107, and remote speaker.

The laptop 116, in particular, may be any wireless communication device used for infrastructure RAN or direct-mode media communication via a long-range or short-range wireless transmitter with other communication devices and/or the infrastructure RAN 152. The laptop 116 includes a display screen for displaying a user interface to an operating system and one or more applications running on the operating system, such as a broadband PTT communications application, a web browser application, a vehicle history database application, a workflow application, a forms or reporting tool application, an arrest record database application, an outstanding warrant database application, a mapping and/or navigation application, a health information database application, and/or other types of applications that may require user interaction to operate. The laptop 116 display screen may be, for example, an LCD screen or an OLED display screen, and the like. In some embodiments, a touch sensitive input interface may be incorporated into the display screen as well, allowing the responder 101 to interact with content provided on the display screen. A soft PTT input may also be provided, for example, via such a touch interface. However, the laptop 116 may be optional as carrying a laptop during a public safety incident may be challenging for the responder 101.

Front and/or rear-facing video cameras (not depicted), as well as one or more microphones) may also be provided at the laptop 116, integrating an ability to capture video and/or audio of the responder 101 and surroundings, which may include a field-of-view of the responder 101 and/or a suspect (or potential suspect, such as the person 102) and the suspect's surroundings, and store and/or otherwise process the captured video and/or audio for further analysis or transmit the captured video and/or audio as a video and/or audio stream to the portable radio 107, other communication devices, and/or the infrastructure RAN 152 for further analysis.

The headphone 120 may comprise an in-ear or over-the-ear earpiece and may be present for providing audio to the responder 101 in a private fashion that is not accessible to other users nearby the responder 101. The headphone 120 may be wiredly or wirelessly communicatively coupled to one or both of the RSM video capture device 108 and the portable radio 107, which may be configured to provide audio received from the infrastructure RAN 152 and/or from other users to the responder 101 based on a manual configuration of the RSM video capture device 108 or the portable radio 107, or based on some automatic routing mechanism at the one of the RSM video capture device 108 and the portable radio 107 that may route all audio to the earpiece or headphone 120 whenever it is detected as connected to the one of the RSM video capture device 108 and the portable radio 107, or may selectively route audio received at the one of the RSM video capture device 108 and the portable radio 107 to the earpiece or headphone 120 based on various contextual parameters, such as a content of the received audio, an identity of who sent the received audio, a covert status of the responder 101, an incident status of the responder 101, a determination of nearby users associated with the responder 101, or some other contextual parameter.

The smart glasses 117 may include a digital imaging device, an electronic processor, a short-range and/or long-range transceiver device, and/or a projecting device and/or one or more microphones. The smart glasses 117 may maintain a bi-directional connection with the portable radio 107 and provide an always-on or on-demand video feed pointed in a direction of a gaze of the responder 101 via the digital imaging device, and/or may provide a personal display via the projection device integrated into the smart glasses 117 for displaying information such as text, images, or video received from the portable radio 107 or directly from the infrastructure RAN 152. In some embodiments, the smart glasses 117 may include its own long-range transceiver and may communicate with other communication devices and/or with the infrastructure RAN 152 or vehicular transceiver 137 directly without passing through portable radio 107. In other embodiments, an additional user interface mechanism such as a touch interface or gesture detection mechanism may be provided at the smart glasses 117 that allows the responder 101 to interact with the display elements displayed on the smart glasses 117 or projected into the eyes of the responder 101, or to modify operation of the digital imaging device. In still other embodiments, a display and input interface at the portable radio 107 may be provided for interacting with smart glasses 117 content and modifying operation of the digital imaging device, among other possibilities.

The smart glasses 117 may provide a virtual reality interface in which a computer-simulated reality electronically replicates an environment with which the responder 101 may interact. In some embodiments, the smart glasses 117 may provide an augmented reality interface in which a direct or indirect view of real-world environments in which the user is currently disposed are augmented (i.e., supplemented, by additional computer-generated sensory input such as sound, video, images, graphics, GPS data, or other information). In still other embodiments, the smart glasses 117 may provide a mixed reality interface in which electronically generated objects are inserted in a direct or indirect view of real-world environments in a manner such that they may co-exist and interact in real time with the real-world environment and real-world objects.

The sensor-enabled holster 118 may be an active (powered) or passive (non-powered) sensor that maintains and/or provides state information regarding a weapon or other item normally disposed within the sensor-enabled holster 118. The sensor-enabled holster 118 may detect a change in state (presence to absence) and/or an action (removal) relative to the weapon normally disposed within the sensor-enabled holster 118. The detected change in state and/or action may be reported to the portable radio 107 via its short-range transceiver. In some embodiments, the sensor-enabled holster 118 may also detect whether the first responder's hand is resting on the weapon even if it has not yet been removed from the holster and provide such information to portable radio 107. Other possibilities exist as well.

The biometric sensor wristband 119 may be an electronic device for tracking an activity of the responder 101 or a health status of the responder 101, and may include one or more movement sensors (such as an accelerometer, magnetometer, and/or gyroscope) that may periodically or intermittently provide to the portable radio 107 indications of orientation, direction, steps, acceleration, and/or speed, and indications of health such as one or more of a captured heart rate, a captured breathing rate, and a captured body temperature of the responder 101, which may accompany other information. In some embodiments, the biometric sensor wristband 119 may include its own long-range transceiver and may communicate with other communication devices and/or with the infrastructure RAN 152 or vehicular transceiver 137 directly without passing through portable radio 107.

An accelerometer is a device that measures acceleration. Single and multi-axis models are available to detect magnitude and direction of the acceleration as a vector quantity, and may be used to sense orientation, acceleration, vibration shock, and falling. A gyroscope is a device for measuring or maintaining orientation, based on the principles of conservation of angular momentum. One type of gyroscope, a microelectromechanical system (MEMS) based gyroscope, uses lithographically constructed versions of one or more of a tuning fork, a vibrating wheel, or resonant solid to measure orientation. Other types of gyroscopes could be used as well. A magnetometer is a device used to measure the strength and/or direction of the magnetic field in the vicinity of the device, and may be used to determine a direction in which a person or device is facing.

The heart rate sensor may use electrical contacts with the skin to monitor an electrocardiography (EKG) signal of its wearer, or may use infrared light and imaging device to optically detect a pulse rate of its wearer, among other possibilities.

A breathing rate sensor may be integrated within the sensor wristband 119 itself, or disposed separately and communicate with the sensor wristband 119 via a short-range wireless or wired connection. The breathing rate sensor may include use of a differential capacitive circuits or capacitive transducers to measure chest displacement and thus breathing rates. In other embodiments, a breathing sensor may monitor a periodicity of mouth and/or nose-exhaled air (e.g., using a humidity sensor, temperature sensor, capnometer or spirometer) to detect a respiration rate. Other possibilities exist as well.

A body temperature sensor may include an electronic digital or analog sensor that measures a skin temperature using, for example, a negative temperature coefficient (NTC) thermistor or a resistive temperature detector (RTD), may include an infrared thermal scanner module, and/or may include an ingestible temperature sensor that transmits an internally measured body temperature via a short-range wireless connection, among other possibilities.

Although the biometric sensor wristband 119 is shown in FIG. 1 as a bracelet worn around the wrist, in other examples, the biometric sensor wristband 119 may additionally and/or alternatively be worn around another part of the body, or may take a different physical form including an earring, a finger ring, a necklace, a glove, a belt, or some other type of wearable, ingestible, or insertable form factor.

The portable radio 107 and/or RSM video capture device 108 (or any other electronic device in FIG. 1, for that matter) may each include a location determination device integrated with or separately disposed in the portable radio 107 and/or RSM video capture device 108 and/or in respective receivers, transmitters, or transceivers of the portable radio 107 and RSM video capture device 108 for determining a location of the portable radio 107 and RSM video capture device 108. The location determination device may be, for example, a global positioning system (GPS) receiver or wireless triangulation logic using a wireless receiver or transceiver and a plurality of wireless signals received at the wireless receiver or transceiver from different locations, among other possibilities. The location determination device may also include an orientation sensor for determining an orientation that the device is facing. Each orientation sensor may include a gyroscope and/or a magnetometer. Other types of orientation sensors could be used as well. The location may then be stored locally or transmitted via the transmitter or transceiver to other communication devices and/or to the infrastructure RAN 152.

The vehicle 132 associated with the responder 101 may include the mobile communication device 133, the vehicular video camera 134 and/or microphone 135, and the vehicular transceiver 137, all of which may be coupled to one another via a wired and/or wireless VAN 138 (and/or with any other further sensors physically or communicatively coupled to the vehicle 132). The vehicular transceiver 137 may include a long-range transceiver for directly wirelessly communicating with communication devices such as the portable radio 107, the RSM video capture device 108, and the laptop 116 via wireless link(s) 142 and/or for wirelessly communicating with the RAN via wireless link(s) 144. The vehicular transceiver 137 may further include a short-range wireless transceiver or wired transceiver for communicatively coupling between the mobile communication device 133 and/or the vehicular video camera 134 and/or the microphone 135 in the VAN 138. The mobile communication device 133 may, in some embodiments, include the vehicular transceiver 137 and/or the vehicular video camera 134 and/or the microphone 135 integrated therewith, and may operate to store and/or process video and/or audio produced by the video camera 134 and/or transmit the captured video and/or audio as a video and/or audio stream to the portable radio 107, other communication devices, and/or an infrastructure RAN 152 (described below) for further analysis. The microphone 135 may comprise an omni-directional or unidirectional microphone 135, or an array thereof, may be integrated in the video camera 134 and/or at the mobile communication device 133 (or additionally or alternatively made available at a separate location of the vehicle 132) and communicably coupled to the mobile communication device 133 and/or vehicular transceiver 137 for capturing audio and storing, processing, and/or transmitting the audio in a same or similar manner as set forth above with respect to the RSM video capture device 108.

Although FIG. 1 illustrates the vehicular video camera 134 and microphone 135 as being placed inside the vehicle 132, in other embodiments, one or both of the vehicular video camera 134 and microphone 135 may be placed at visible or hidden locations outside of the vehicle 132, such as within a vehicular grill portion or bumper portion, or on a roof portion, of the vehicle 132. Further, although FIG. 1 illustrates the speaker 136 as being placed inside of the vehicle 132 and coupled to the mobile communication device 133, in other embodiments, multiple speakers may be provided inside and/or outside of the vehicle 132 (all addressed simultaneously or individually addressable for outputting separate audio streams), or the single speaker 136 may be placed outside of the vehicle and function as a PA speaker, among other possibilities.

The vehicle 132 may be a human-operable vehicle, or may be a self-driving vehicle operable under control of mobile communication device 133 and optionally in cooperation with video camera 134 (which may include a visible-light camera, an infrared camera, a time-of-flight depth camera, and/or a light detection and ranging (LiDAR) device). Command information and/or status information such as location and speed may be exchanged with the self-driving vehicle via the VAN 138 and/or the PAN (when the PAN is in range of the VAN 138 or via infrastructure RAN link of the VAN 138).

The vehicle 132 and/or transceiver 137, similar to the portable radio 107 and/or respective receivers, transmitters, or transceivers thereof, may include a location (and/or orientation) determination device integrated with or separately disposed in the mobile communication device 133 and/or transceiver 137 for determining (and storing and/or transmitting) a location (and/or orientation) of the vehicle 132.

In some embodiments, instead of a vehicle 132, a land, air, or water-based drone with the same or similar audio and/or video and communications capabilities and the same or similar self-navigating capabilities as set forth above may be disposed, and may similarly communicate with the PAN 121 and/or with the infrastructure RAN 152 to support the responder 101 in the field.

The VAN 138 may communicatively couple with the PAN 121, disclosed above, when the VAN 138 and the PAN 121 come within wireless transmission range of one another, which may include an authentication that takes place there between. In some embodiments, one of the VAN 138 and the PAN 121 may provide infrastructure communications to the other, depending on the situation and the types of devices in the VAN 138 and/or PAN 121 and may provide interoperability and communication links between devices (such as video cameras and sensors) within the VAN 138 and PAN 121.

The infrastructure RAN 152 comprises a radio access network that provides for radio communication links to be arranged within the network between a plurality of user terminals. Such user terminals may be portable, mobile, or stationary and may include any one or more of the communication devices illustrated in FIG. 1, among other possibilities. At least one other terminal, e.g. used in conjunction with the communication devices, may be a fixed terminal, e.g. a base station, eNodeB, repeater, and/or access point. Such an infrastructure RAN typically includes a system infrastructure that generally includes a network of various fixed terminals, such as antennas and the like, which are in direct radio communication with the communication devices. Each of the fixed terminals operating in the RAN may have one or more transceivers which may, for example, serve communication devices in a given region or area, known as a 'cell' or 'site', by radio frequency (RF) communication. The communication devices that are in direct communication with a particular fixed terminal are said to be served by the fixed terminal. In one example, all radio communications to and from each communication device within the RAN are made via respective serving fixed terminals. Sites of neighboring fixed terminals may be offset from one another and may provide corresponding non-overlapping or partially or fully overlapping RF coverage areas.

The infrastructure RAN 152 may operate according to an industry standard wireless access technology such as, for example, an LTE, LTE-Advance, or 5G technology over which an OMA-PoC, a VoIP, an LTE Direct or LTE Device to Device, or a PoIP application may be implemented. Additionally, or alternatively, the infrastructure RAN 152 may implement a WLAN technology such as Wi-Fi, for example operating in accordance with an IEEE 802.11 standard (e.g., 802.11a, 802.11b, 802.11g) or such as a WiMAX, for example operating in accordance with an IEEE 802.16 standard.

The infrastructure RAN 152 may additionally, or alternatively, operate according to an industry standard LMR wireless access technology such as, for example, the P25 standard defined by the APCO, the TETRA standard defined by the ETSI, the dPMR standard also defined by the ETSI, or the DMR standard also defined by the ETSI. Because these systems generally provide lower throughput than the broadband systems, they are sometimes designated as narrowband RANs.

Communications in accordance with any one or more of these protocols or standards, or other protocols or standards, may take place over physical channels in accordance with one or more of a TDMA (time division multiple access), FDMA (frequency divisional multiple access), OFDMA (orthogonal frequency division multiplexing access), or CDMA (code division multiple access) technique.

OMA-PoC, in particular and as one example of an infrastructure broadband wireless application, enables familiar PTT and "instant on" features of traditional half duplex communication devices, but uses communication devices operating over modern broadband telecommunications networks. Using OMA-PoC, wireless communication devices such as mobile telephones and notebook computers can function as PTT half-duplex communication devices for transmitting and receiving. Other types of PTT models and multimedia call models (MMCMs) are also available.

Floor control in an OMA-PoC session is generally maintained by a PTT server that controls communications between two or more wireless communication devices. When a user of one of the communication devices keys a PTT button, a request for permission to speak in the OMA-PoC session is transmitted from the user's communication device to the PTT server using, for example, a real-time transport protocol (RTP) message. If no other users are currently speaking in the PoC session, an acceptance message is transmitted back to the user's communication device and the user may then speak into a microphone of the communication device. Using standard compression/decompression (codec) techniques, the user's voice is digitized and transmitted using discrete auditory data packets (e.g., together which form an auditory data stream over time), such as according to RTP and internet protocols (IP), to the PTT server. The PTT server then transmits the auditory data packets to other users of the PoC session (e.g., to other communication devices in the group of communication devices or talkgroup to which the user is subscribed), using for example, one or more of a unicast, point to multipoint, or broadcast communication technique.

Infrastructure narrowband LMR wireless systems, on the other hand, operate in either a conventional or trunked configuration. In either configuration, a plurality of communication devices is partitioned into separate groups of communication devices. In a conventional narrowband system, each communication device in a group is selected to a particular radio channel (frequency or frequency & time slot) for communications associated with that communication device's group. Thus, each group is served by one channel, and multiple groups may share the same single frequency or frequency & time slot (in which case, in some embodiments, group IDs may be present in the group data to distinguish between groups).

In contrast, a trunked radio system and its communication devices use a pool of traffic channels for virtually an unlimited number of groups of communication devices (and which may also be referred to herein as talkgroups). Thus, all groups are served by all channels. The trunked radio system works to take advantage of the probability that not all groups need a traffic channel for communication at the same time. When a member of a group requests a call on a control or rest channel on which all of the communication devices at a site idle awaiting new call notifications, in one embodiment, a call controller assigns a separate traffic channel for the requested group call, and all group members move from the assigned control or rest channel to the assigned traffic channel for the group call. In another embodiment, when a member of a group requests a call on a control or rest channel, the call controller may convert the control or rest channel on which the communication devices were idling to a traffic channel for the call, and instruct all communication devices that are not participating in the new call to move to a newly assigned control or rest channel selected from the pool of available channels. With a given number of channels, a much greater number of groups may be accommodated in a trunked radio system as compared with a conventional radio system.

Group calls may be made between wireless and/or wireline participants in accordance with either a narrowband or a broadband protocol or standard. Group members for group calls may be statically or dynamically defined. That is, in a first example, a user or administrator working on behalf of the user may indicate to the switching and/or radio network (for example, at a call controller, PTT server, zone controller, or mobile management entity (MME), base station controller (BSC), mobile switching center (MSC), site controller, Push-to-Talk controller, or other network device) a list of participants of a group at the time of the call or in advance of the call. The group members (e.g., communication devices) could be provisioned in the network by the user or an agent, and then provided some form of group identity or identifier, for example. Then, at a future time, an originating user in a group may cause some signaling to be transmitted indicating that he or she wishes to establish a communication session (e.g., group call) with each of the pre-designated participants in the defined group. In another example, communication devices may dynamically affiliate with a group (and also disassociate with the group) for example based on user input, and the switching and/or radio network may track group membership and route new group calls according to the current group membership.

In some instances, broadband and narrowband systems may be interfaced via a middleware system that translates between a narrowband PTT standard protocol (such as P25) and a broadband PTT standard protocol or application (such as OMA-PoC). Such intermediate middleware may include a middleware server for performing the translations and may be disposed in the cloud, disposed in a dedicated on-premises location for a client wishing to use both technologies, or disposed at a public carrier supporting one or both technologies. For example, and with respect to FIG. 1, such a middleware server may be disposed in the infrastructure RAN 152, at the infrastructure controller 156 or at a separate cloud computing cluster (not depicted) communicably coupled to the infrastructure controller 156 via an internet protocol (IP) network (not depicted), among other possibilities.

The infrastructure RAN 152 is illustrated in FIG. 1 as providing coverage for the PAN 121 and/or the portable radio 107, the RSM video capture device 108, the laptop 116, the smart glasses 117, and/or the vehicle transceiver 137 and/or the VAN 138. In general, the infrastructure RAN 152 communicatively couples the PAN 121 and/or the portable radio 107, the RSM video capture device 108, the laptop 116, the smart glasses 117, and/or the vehicle transceiver 137 and/or the VAN 138 to a single infrastructure controller 156, which is in turn in communication with a dispatch computing device 158 which include one or more dispatch terminals operated by one or more dispatchers. The infrastructure controller 156 further couples the PAN 121 and/or the portable radio 107, the RSM video capture device 108, the laptop 116, the smart glasses 117, and/or the vehicle transceiver 137 and/or the VAN 138 to an analytical computing device 162, for example via an internet protocol (IP) network (not depicted), and the like.

For example, infrastructure RAN 152 may include one or more fixed antennas, fixed terminals, and the like (not depicted) which couple the infrastructure RAN 152 to the infrastructure controller 156 (e.g., a radio controller, call controller, PTT server, zone controller, MME, BSC, MSC, site controller, Push-to-Talk controller, or other network device) the dispatch computing device 158 and the analytical computing device 162. In other embodiments, a plurality of fixed antennas and/or terminals and additional controllers may be disposed to support a larger geographic footprint and/or a larger number of mobile devices.

The infrastructure controller 156 illustrated in FIG. 1, or some other back-end infrastructure device or combination of back-end infrastructure devices existing on-premises or in a remote cloud compute cluster accessible via an IP network (such as the Internet), may additionally or alternatively operate as a back-end electronic digital assistant, a back-end audio and/or video processing device, and/or a remote cloud-based storage device consistent with the remainder of this disclosure.

It is assumed in FIG. 1 that an IP network is present which couples the infrastructure controller 156 to the analytical computing device 162, as well as one or more database 163 and/or a media access computing device 169 described in more detail below. Such an IP network may comprise one or more routers, switches, LANs, WLANs, WANs, access points, or other network infrastructure, including but not limited to, the public Internet.

The analytical computing device 162 may comprise of a plurality of computing devices in a cloud compute cluster arrangement, one or more of which may be executing none, all, or a portion of an electronic digital assistant service, sequentially or in parallel, across the one or more computing devices. The one or more computing devices comprising the analytical computing device 162 may be geographically co-located or may be separated by inches, meters, kilometers or miles, and inter-connected via electronic and/or optical interconnects. Although not shown in FIG. 1, one or more proxy servers or load balancing servers may control which one or more computing devices perform any part or all of the electronic digital assistant service.

As depicted, the system 100 may further comprise the one or more databases 163 which may be accessible via an IP network and/or the analytical computing device 162, and may include databases such as a long-term video storage database, a historical or forecasted weather database, an offender database which may include, but is not limited to, facial recognition images to match against, a cartographic database of streets and elevations, a traffic database of historical or current traffic conditions, or other types of databases. The one or more databases 163 may further include all or a portion of the databases described herein as being provided at infrastructure controller 156. In some embodiments, the one or more databases 163 may be maintained by third parties (for example, the National Weather Service or a Department of Transportation, respectively). As shown in FIG. 1, the one or more databases 163 may be communicatively coupled with the infrastructure RAN 152 (e.g. via an IP network) to allow communication devices (for example, the portable radio 107, the RSM video capture device 108, the laptop 116, and the mobile communication device 133) to communicate with and retrieve data from the one or more databases 163 via the infrastructure controller 156. In some embodiments, the one or more databases 163 are commercial cloud-based storage devices. In some embodiments, the one or more databases 163 are housed on suitable on-premises database servers. The one or more databases 163 of FIG. 1 are merely examples. In some embodiments, the system 100 additionally or alternatively includes other databases that store different information. In some embodiments, the one or more databases 163 disclosed herein and/or additional or other databases are integrated with, or internal to, the infrastructure controller 156.

In some embodiments, the one or more databases 163 may further comprise a repository for evidence, including, but not limited to, multimedia data collected by edge devices of the system 100.

In some embodiments, the one or more databases 163 may further comprise a database for protocols that the responder 101 is to follow when given types of events occur, for example, verbal assaults, physical interactions, and the like.

In some embodiments, the one or more databases 163 may further comprise a database for associations between given event types and multimedia data that is to be collected to document the given event types.

In some embodiments, the one or more databases 163 may further comprise a database of rules for successfully documenting given event types.

Although the RSM video capture device 108, the laptop 116, and the vehicle 132 are illustrated in FIG. 1 as providing example video cameras and/or microphones for use in capturing audio and/or video streams, other types of cameras and/or microphones could be used as well, including but not limited to, fixed or pivotable video cameras secured to lamp posts, automated teller machine (ATM) video cameras, other types of body worn cameras such as head-mounted cameras, other types of vehicular cameras such as roof-mounted cameras, or other types of audio and/or video recording devices accessible via a wired or wireless network interface same or similar to that disclosed herein.

For example, as depicted, the system 100 further comprises the media access computing device 169 that may be a component of the analytical computing device 162 and/or the dispatch computing device and/or a component of the cloud compute cluster arrangement of the analytical computing device 162 and/or a standalone computing device. Either way, the media access computing device 169 is in communication with the analytical computing device 162 and/or the devices of the PAN 121 and/or the VAN 138, for example via an IP network.

The media access computing device 169 is further configured to communicate with at least one camera 173 (e.g. a closed-circuit television (CCTV) camera, a video camera, and the like) at the location of the responder 101 and/or the person 102, as well as at least one optional microphone 175 and/or an optional speaker 176, which may also be edge devices. The optional microphone 175 and/or the optional speaker 176 may be components of the at least one camera 173 (e.g. as depicted) and/or may be separate from the at least one camera 173. Furthermore, the at least one camera 173 (and/or the microphone 175 and/or the speaker 176) may be a component of a public safety monitoring system and/or may be a component of a commercial monitoring and/or private security system to which the computing device 169 has been provided access. The camera 173 and/or the microphone 175 generally generate one or more of video data, audio data and multimedia data associated with the location of the responder 101 and/or the person 102; for example, the camera 173 may be positioned to generate video data of the location of the responder 101 and/or the person 102, and the microphone 175 may be positioned to generate audio data of the location of the responder 101 and/or the person 102, such as voices of the responder 101 and/or the person 102 (e.g. the threat 103 and/or the aural command 104). The speaker 176 may be controlled to provide alerts and/or notifications and/or announcements.

Although FIG. 1 describes a communication system 100 generally as a public safety communication system that includes a responder 101 generally described as a police officer and a vehicle 132 generally described as a police car or cruiser, in other embodiments, the communication system 100 may additionally or alternatively be a retail communication system including a user that may be an employee of a retailer and a vehicle 132 that may be a vehicle for use by the responder 101 in furtherance of the employee's retail duties (e.g., a shuttle or self-balancing scooter). In other embodiments, the communication system 100 may additionally or alternatively be a warehouse communication system including a responder 101 that may be an employee of a warehouse and a vehicle 132 that may be a vehicle for use by the responder 101 in furtherance of the employee's retail duties (e.g., a forklift). In still further embodiments, the communication system 100 may additionally or alternatively be a private security communication system including a responder 101 that may be an employee of a private security company and a vehicle 132 that may be a vehicle for use by the responder 101 in furtherance of the private security employee's duties (e.g., a private security vehicle or motorcycle). In even further embodiments, the communication system 100 may additionally or alternatively be a medical communication system including a responder 101 that may be a doctor or nurse of a hospital and a vehicle 132 that may be a vehicle for use by the responder 101 in furtherance of the doctor or nurse's duties (e.g., a medical gurney or ambulance). In still another example embodiment, the communication system 100 may additionally or alternatively be a heavy machinery communication system including a responder 101 that may be a miner, driller, or extractor at a mine, oil field, or precious metal or gem field and a vehicle 132 that may be a vehicle for use by the responder 101 in furtherance of the miner, driller, or extractor's duties (e.g., an excavator, bulldozer, crane, front loader). As one other example, the communication system 100 may additionally or alternatively be a transportation logistics communication system including a responder 101 that may be a bus driver or semi-truck driver at a school or transportation company and a vehicle 132 that may be a vehicle for use by the responder 101 in furtherance of the driver's duties.

In the examples of the responder 101 being other than a police officer, certain sensors such as the weapon status sensor described above with respect to the police officer user may be replaced or supplemented with other types of sensors, such as one or more sensors that may detect whether a particular retail, warehouse, private security, heavy machinery operator, transportation driver, or other type of user has equipment necessary to perform a particular assigned or to-be-assigned task, whether such equipment is in a workable or sufficient condition, or whether the equipment is sufficient for the area or environment the user is in. Other possibilities and other variations exist as well.

One or more devices of the system 100 is generally configured to perform video and/or audio analytics on video data and/or audio data and/or multimedia data received from one or more of the video camera 114, the microphone 115, the laptop 116, the smart glasses 117, the video camera 134, the microphone 135, the at least one camera 173 and/or the microphone 175. Indeed, herein, multimedia data may comprise one or more of video data and audio data.

Such video and/or audio analytics may be performed using one or more machine learning algorithms which may include, but are not limited to: a generalized linear regression algorithm; a random forest algorithm; a support vector machine algorithm; a gradient boosting regression algorithm; a decision tree algorithm; a generalized additive model; neural network algorithms, deep learning algorithms, evolutionary programming algorithms, and the like.

However, generalized linear regression algorithms, random forest algorithms, support vector machine algorithms, gradient boosting regression algorithms, decision tree algorithms, generalized additive models, and the like may be preferred over neural network algorithms, deep learning algorithms, evolutionary programming algorithms, and the like, in some public safety environments.

Figure 2:
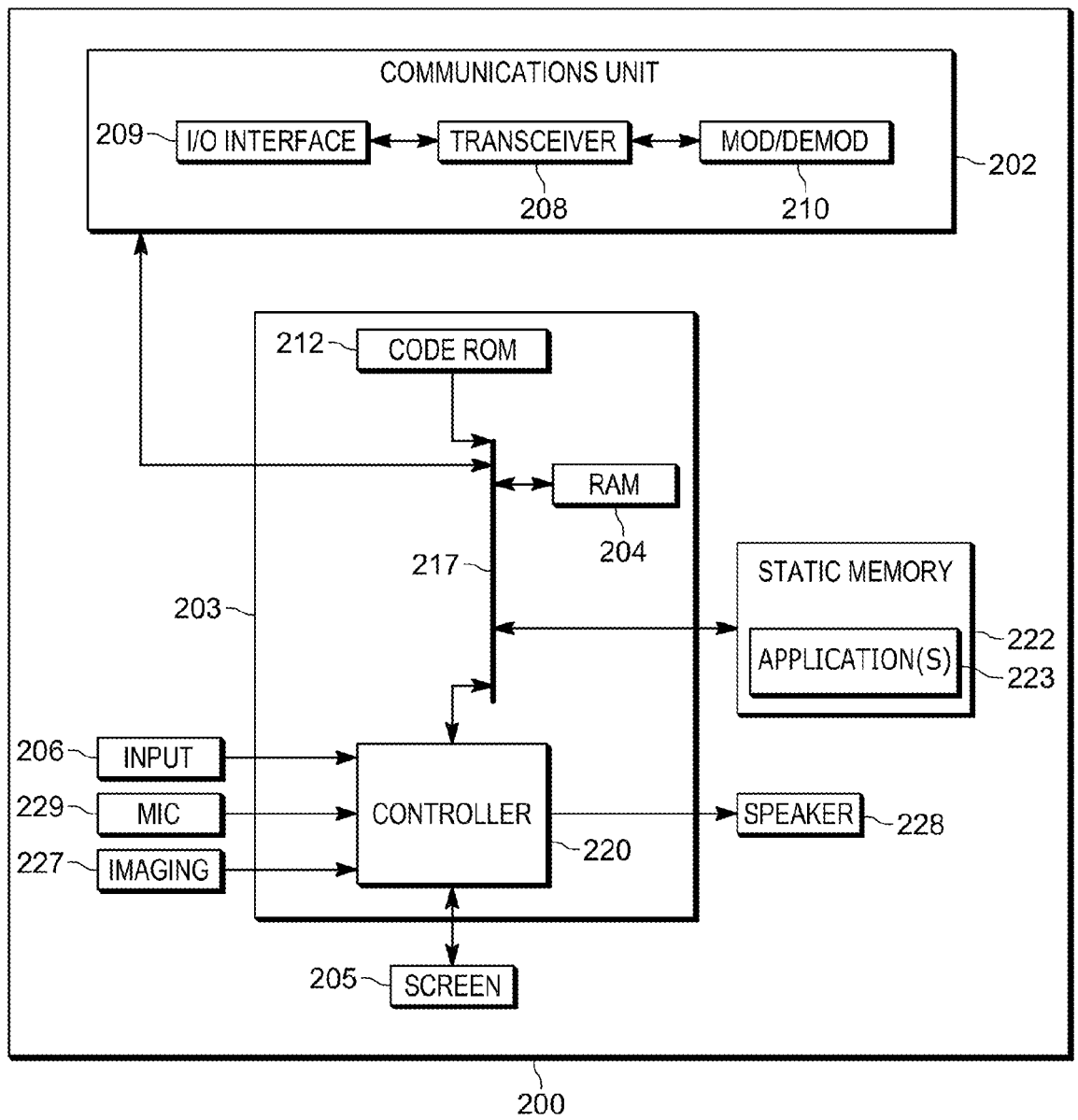
FIG. 2 is a device diagram showing a device structure of an electronic computing device for controlling a communication device to provide notifications of successful documentation of events in accordance with some embodiments.

Attention is next directed to FIG. 2 which sets forth a schematic diagram that illustrates a computing device and/or a communication device 200 (interchangeably referred to hereafter as the device 200 according to some embodiments of the present disclosure. The device 200 may be, for example, embodied in the portable radio 107, the RSM video capture device 108, the laptop 116, the mobile communication device 133, the infrastructure controller 156, the dispatch computing device 158, the analytical computing device 162, the media access computing device 169, or some other communication device and/or computing device not illustrated in FIG. 1, and/or may be a distributed computing and/or communication device across two or more of the foregoing (or multiple of a same type of one of the foregoing) and linked via a wired and/or wireless communication link(s).

As depicted, the device 200 generally includes a communications unit 202, a processing unit 203, a Random-access Memory (RAM) 204, a display screen 205, an input device 206, one or more wireless transceivers 208, one or more wired and/or wireless input/output (I/O) interfaces 209, a combined modulator/demodulator 210, a code Read Only Memory (ROM) 212, a common data and address bus 217, a controller 220, a static memory 222 storing one or more applications 223, an imaging device 227, a speaker 228, a microphone 229.

However, while the device 200 is described with respect to including certain components, it is understood that the device 200 may be configured according to the functionality of a specific device.

Hence, while the device 200 represents the computing and/or communication devices described above with respect to FIG. 1, depending on the type of the computing and/or communication device, the device 200 may include fewer or additional components in configurations different from that illustrated in FIG. 2. For example, in some embodiments, device 200 acting as the infrastructure controller 156 and/or the analytical computing device 162 and/or the media access computing device 169 may not include one or more of the display screen 205, input device 206, microphone 229, imaging device 227, and speaker 228. As another example, in some embodiments, the device 200 acting as the portable radio 107 or the RSM video capture device 108 may further include a location determination device (for example, a global positioning system (GPS) receiver) as explained above. Other combinations are possible as well.

Furthermore, when the device 200 is configured as the portable radio 107, the device 200 may be configured communicatively coupled to other devices such as the sensor-enabled holster 118 as described above. Furthermore, in such embodiments, the combination of the portable radio 107 and the sensor-enabled holster 118 may be considered a single device 200.

The device 200 is described hereafter in further detail. As shown in FIG. 2, the device 200 includes the communications unit 202 coupled to the common data and address bus 217 of the processing unit 203. The device 200 may also include one or more input devices 206 (e.g., keypad, pointing device, touch-sensitive surface, etc.) and the display screen 205 (which, in some embodiments, may be a touch screen and thus also act as an input device 206), each coupled to be in communication with the processing unit 203.

The imaging device 227 may provide video (still or moving images) of an area in a field of view of the device 200 for further processing by the processing unit 203 and/or for further transmission by the communications unit 202. The speaker 228 may be present for reproducing audio that is decoded from voice or audio streams of calls received via the communications unit 202 from other portable radios, from digital audio stored at the device 200, from other ad-hoc or direct mode devices, and/or from an infrastructure RAN device, or may playback alert tones or other types of pre-recorded audio. The microphone 229 may be present for capturing audio from a user and/or other environmental or background audio that is further processed by the processing unit 203 in accordance with the remainder of this disclosure and/or is transmitted as voice or audio stream data, or as acoustical environment indications, by the communications unit 202 to other portable radios and/or other communication devices.

The processing unit 203 may include the code Read Only Memory (ROM) 212 coupled to the common data and address bus 217 for storing data for initializing system components. The processing unit 203 may further include the controller 220 coupled, by the common data and address bus 217, to the Random-Access Memory (RAM) 204 and a static memory 222.

The communications unit 202 may include one or more wired and/or wireless input/output (I/O) interfaces 209 that are configurable to communicate with other communication devices, such as the portable radio 107, the laptop 116, the wireless RAN, and/or the mobile communication device 133.

For example, the communications unit 202 may include one or more wireless transceivers 208, such as a DMR transceiver, a P25 transceiver, a Bluetooth transceiver, a Wi-Fi transceiver, for example operating in accordance with an IEEE 802.11 standard (e.g., 802.11a, 802.11b, 802.11g), an LTE transceiver, a WiMAX transceiver, for example operating in accordance with an IEEE 802.16 standard, and/or another similar type of wireless transceiver configurable to communicate via a wireless radio network.

The communications unit 202 may additionally or alternatively include one or more wireline transceivers 208, such as an Ethernet transceiver, a USB transceiver, or similar transceiver configurable to communicate via a twisted pair wire, a coaxial cable, a fiber-optic link, or a similar physical connection to a wireline network. The transceiver 208 is also coupled to a combined modulator/demodulator 210.

The controller 220 may include ports for coupling to the display screen 205, the input device 206, the imaging device 227, the speaker 228 and/or the microphone 229.

The controller 220 includes one or more logic circuits, one or more processors, one or more microprocessors, one or more ASIC (application-specific integrated circuits) and one or more FPGA (field-programmable gate arrays), and/or another electronic device. In some embodiments, the controller 220 and/or the device 200 is not a generic controller and/or a generic device, but a device specifically configured to implement functionality for controlling a communication device to provide notifications of successful documentation of events. For example, in some embodiments, the device 200 and/or the controller 220 specifically comprises a computer executable engine configured to implement specific functionality for controlling a communication device to provide notifications of successful documentation of events.

The static memory 222 is a machine readable medium that stores machine readable instructions to implement one or more programs or applications. Example machine readable media include a non-volatile storage unit (e.g. Erasable Electronic Programmable Read Only Memory ("EEPROM"), Flash Memory) and/or a volatile storage unit (e.g. random-access memory ("RAM")). In the embodiment of FIG. 2, programming instructions (e.g., machine readable instructions) that implement the functional teachings of the device 200 as described herein are maintained, persistently, at the memory 222 and used by the controller 220 which makes appropriate utilization of volatile storage during the execution of such programming instructions.

In particular, the static memory 222 stores instructions corresponding to the one or more applications 223 that, when executed by the controller 220, enables the controller 220 to implement functionality for controlling a communication device to provide notifications of successful documentation of events. In illustrated examples, when the controller 220 executes the one or more applications 223, the controller 220 is enabled to: receive a type of a recognized event occurring at a location of an edge device; determine, based on the type of the recognized event, one or more multimedia data types for collection to document the recognized event; cause the edge device to collect multimedia data of the one or more multimedia data types; receive an indication that the multimedia data has been stored successfully; determine whether the multimedia data has successfully documented the recognized event; and when the multimedia data has successfully documented the recognized event, control the edge device to provide a notification of successful documentation of the recognized event. Different applications, of the one or more applications 223, may be used to operate the device 200 in different modes, for example, for different event types and/or different multimedia data types. For simplicity, the one or more applications 223 will be interchangeably referred to hereafter as the application 223.

In some embodiments, an individual component and/or a combination of individual components of the system 100 may be referred to as an electronic computing device that implements an electronic digital assistant. For example, the electronic computing device may be a single electronic processor (for example, the controller 220 of the portable radio 107). In other embodiments, the electronic computing device includes multiple electronic processors distributed remotely from each other. For example, the electronic computing device may be implemented on a combination of at least two of the controller 220 of the portable radio 107, the controller 220 of the infrastructure controller 156, and the controller 220 of the analytical computing device 162 accessible via an IP network and the like.

In some embodiments, static memory 222 may also store, permanently or temporarily, a threshold level mapping indicating numerical ranges at which auditory output generated by the electronic digital assistant may be lengthened and/or shortened, a database of acronyms and their associated full terms for use in transitioning between one or the other based on a detected acoustic environment, a thesaurus database of words having similar meanings and including a syllable count for use in transitioning between them based on a detected acoustic environment, a 10-code database including the 10-code and the 10-codes associated full term meaning for use in transitioning between one or the other based on a detected acoustic environment, a contraction database setting forth contractions and the words they stand for use in transitioning between one or the other based on a detected acoustic environment, and an abbreviation database including the abbreviation and the full word that the abbreviation abbreviates for use in transitioning between one or the other based on a detected acoustic environment.

To use the electronic digital assistant implemented by the device 200, the responder 101 may, for example, provide an oral query or statement that is received by the microphone 229 of the device 200. The device 200 receives signals representative of the oral query or statement from the microphone 229 and analyzes the signals to determine the content of the oral query or statement. For example, the electronic computing device may include a natural language processing (NLP) engine (e.g. as a component of the application 223), and/or machine learning algorithms described above, configured to determine the intent and/or content of the oral query or statement. The device 200 may also be configured to determine a response to the oral query (for example, by retrieving stored data or by requesting data from a database such as one of the one or more databases 163) and provide the response to an output device of the device 200 (for example, one or more of the speaker 228 via a generated audio response and the display screen 205 via a generated text based response), or some other action to take in light of the content of the oral query and/or statement.

In other words, one or more of the device 200, embodied in one or more of the communication devices of FIG. 1, such as the portable radio 107, the infrastructure controller 156, and/or the analytical computing device 162, may include an NLP engine and/or one or more machine learning algorithms to analyze oral queries and/or statements received by the microphone 229 of the device 200 and provide responses to the oral queries and/or take other actions in response to the oral statements.

Although an oral query and/or statement is described above, in some embodiments, the device 200 receives and responds to other types of queries and inputs. For example, the responder 101 may submit a text query or statement to the device 200 by typing the text query or statement into a hard keyboard input device 206 or a soft keyboard input provided on the display screen 205 of the device 200. As another example, the responder 101 may use the imaging device 227 to capture an image or video of an area and press a hard or soft key to send the image or video to the electronic computing device to, for example, allow the electronic computing device to identify an object in the image or video and provide a response and/or take other actions.

Alternatively, the device 200, and/or the electronic digital assistant implemented by the device 200, may automatically perform (e.g. via execution of the application 223) video and/or audio analytics (e.g. using one or more machine learning algorithms) on video data and/or audio data and/or multimedia data received from one or more of the video camera 114, the microphone 115, the laptop 116, the smart glasses 117, the video camera 134, the microphone 135, the at least one camera 173 and/or the microphone 175, as described hereafter. Put another way, the device 200 may include one or more of an audio analytics engine and a video analytics engine (e.g. as components of the application 223), which may rely on one or more machine learning algorithms.

Figure 3:
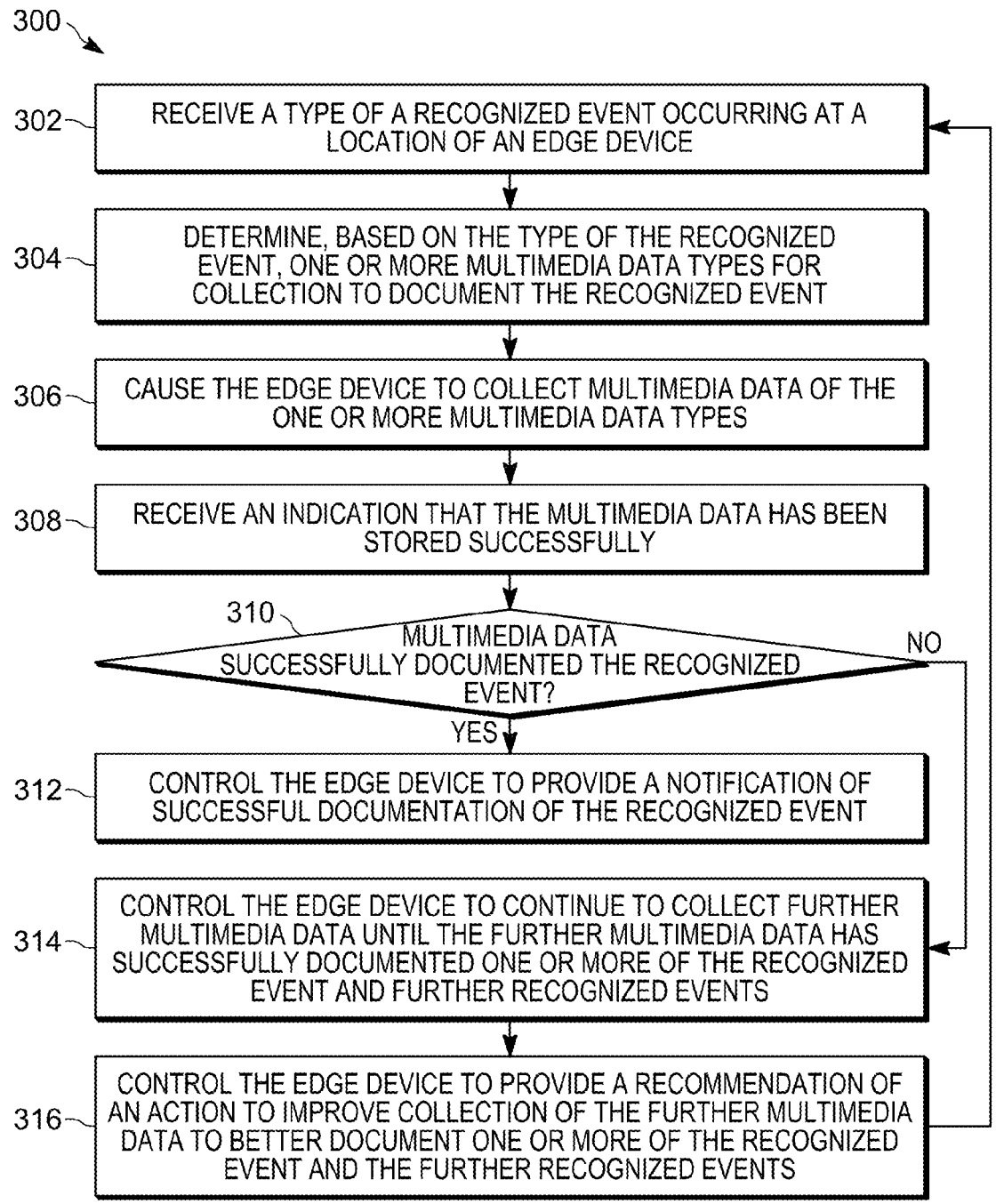
FIG. 3 is a flowchart of a method for controlling a communication device to provide notifications of successful documentation of events in accordance with some embodiments.

Attention is now directed to FIG. 3 which depicts a flowchart representative of a method 300 for controlling a communication device to provide notifications of successful documentation of events. The operations of the method 300 of FIG. 3 correspond to machine readable instructions that are executed by, for example, the device 200, and specifically by the controller 220 of the device 200. In the illustrated example, the instructions represented by the blocks of FIG. 3 are stored at the memory 222 for example, as the application 223. The method 300 of FIG. 3 is one way in which the controller 220 and/or the device 200 and/or the system 100 is configured. Furthermore, the following discussion of the method 300 of FIG. 3 will lead to a further understanding of the system 100, and its various components. However, it is to be understood that the method 300 and/or the system 100 may be varied, and need not work exactly as discussed herein in conjunction with each other, and that such variations are within the scope of present embodiments.

The method 300 of FIG. 3 need not be performed in the exact sequence as shown and likewise various blocks may be performed in parallel rather than in sequence. Accordingly, the elements of method 300 are referred to herein as "blocks" rather than "steps." The method 300 of FIG. 3 may be implemented on variations of the system 100 of FIG. 1, as well.

Furthermore, while it is assumed hereafter that the method 300 is performed at one device 200, such as the analytical computing device 162, the method 300 may be performed at one or more devices 200, for example at a combination of one or more of the portable radio 107, the infrastructure controller 156, the dispatch computing device 158, the analytical computing device 162, the media access computing device 169, etc.

Furthermore, the method 300 is described hereafter with respect to the responder 101 and the person 102 interacting in a particular type of event (e.g. where the person 102 is in a physical interaction with the responder 101, for example threatening the responder 101 as depicted in FIG. 1); however, the method 300 may be performed with respect to any type of recognized event where any type of responder is interacting with a person and the event is to be documented.

At a block 302, the controller 220 receives a type of a recognized event occurring at a location of an edge device.

For example, the type of recognized event may be determined by a controller of an edge device (e.g. the portable radio 107) and/or a controller associated with the at least one camera 173 including, but not limited to a controller of the media access computing device 169), based on multimedia data received at an edge device (e.g. from one or more of from one or more of the video camera 114, the microphone 115, the laptop 116, the smart glasses 117, the video camera 134, the microphone 135, the at least one camera 173 and/or the microphone 175), and transmitted to the controller 220, for example at the analytical computing device 162. The multimedia data may include video data.

Alternatively, the controller 220 may receive a type of a recognized event by way of receiving the multimedia data, and analyzing the multimedia data; in such embodiments one or more of the video camera 114, the microphone 115, the laptop 116, the smart glasses 117, the video camera 134, the microphone 135, the at least one camera 173 and/or the microphone 175 may be streaming multimedia data to the analytical computing device 162. The multimedia data may include video data of the person 102 and/or the responder 101 gesturing, and/or the multimedia data may include audio data of the threat 103 and/or the aural command 104.

Regardless of where the determination of the type of recognized event occurs, such a determination may occur using one or more of audio analytics and video analytics (e.g. at the controller 220 of the analytical computing device 162 and/or the portable radio 107 and/or the media access computing device 169, and the like).

For example, the controller 220 may be configured to analyze audio data and video data (collectively referred to as multimedia data) to determine whether words spoken by the responder 101 and/or the person 102 (e.g. in the aural command 104 and/or the threat 103), and/or whether actions of the responder 101 and/or the person 102 (e.g. gesturing of the responder 101 and/or punching of the person 102), indicate a given type of event. In some implementations the controller 220 may implement natural language processing to compare words spoken by the responder 101 and/or the person 102 with a stored list of words to determine a given type of event; and/or the controller 220 may implement one or more machine learning algorithms to determine whether the responder 101 and/or the person 102 has spoked words that indicate a given type of event.

Similarly, the controller 220 may implement video analytics and/or one or more machine learning algorithms to determine whether actions of the responder 101 and/or the person 102 indicate a given type of event. For example, audio data and/or video data and/or multimedia data may be received which indicates that the person 102 is verbally and/or physically threatening the responder 101. As such, the type of recognized event may be determined to be a verbal and/or physical threat and/or a physical interaction between the responder 101 and the person 102 and/or physical interaction between an operator of the edge device and a person.

In addition, the type may be associated with an alphanumerical code, and the like, which may be used to look up one or more multimedia data types for collection to document the recognized event, for example using the one or more databases 163. The code, when used, may be generated at the edge device (e.g. the portable radio 107) and/or the media access computing device 169 and/or the analytical computing device 162 monitoring the multimedia data. For example, the event of FIG. 1 may be assigned a code associated with a physical interaction between an operator of the edge device and a person.

At a block 304, the controller 220 determines, based on the type of the recognized event, one or more multimedia data types for collection to document the recognized event. For example, the one or more multimedia data types to collect may include one or more of audio data and video data. When the type of the recognized event comprises a verbal event, the multimedia data type for collection may comprise audio data. Similarly, when the type of the recognized event comprises a physical interaction between an operator of the edge device (e.g. the responder 101) and a person (e.g. the person 102), the multimedia data type for collection may comprise video data. Put another way, one or more multimedia data types to collect may include one or more of audio data and video data, the audio data being collected at least when the type of the recognized event comprises a verbal event, and the video data being collected at least when the type of the recognized event comprises a physical interaction between an operator of the edge device and a person.

However, as described herein, when the type of the recognized event comprises a physical interaction between an operator of the edge device (e.g. the responder 101) and a person (e.g. the person 102), the multimedia data type for collection may comprise a combination of audio data and video data.

In some embodiments, the type of multimedia data to collect may be associated with the code described above, for example at the one or more databases 163. In other words, one or more of the one or more databases 163 may store multimedia data types to be collected when an event having a given code occurs.

Furthermore, other types of recognized events are within the scope of the present specification, including, but not limited to, events involving vehicle, machines, and the like. Furthermore, other types of multimedia data are within the scope of the present specification, including, but not limited to, data from the biometric sensor wristband 119 and/or other sensors of the PAN 121, the VAN 138 and the like.

At a block 306, the controller 220 causes the edge device to collect multimedia data of the one or more multimedia data types. For example, the analytical computing device 162 may transmit a control command to the personal radio 107 and/or the media access computing device 169 to collect multimedia data of the one or more multimedia data types. Receipt of such a control command at an edge device of the PAN 121 and/or the VAN 138 may cause the edge device to control one or more of the video camera 114, the microphone 115, the laptop 116, the smart glasses 117, the video camera 134, and the microphone 135, to collect multimedia data, for example not already collecting multimedia data. Alternatively, receipt of such a control command at the media access computing device 169 may cause the media access computing device 169 to control the at least one camera 173 and/or the microphone 175 to collect multimedia data, for example not already collecting multimedia data At a block 308, the controller 220 receives an indication that the multimedia data has been stored successfully. For example, the edge device which is collecting the multimedia data may store the multimedia data at a local memory (e.g. a static memory of the portable radio 107) and/or upload the multimedia data to one or more of the one or more databases 163. Alternatively, the media access computing device 169 which is collecting the multimedia data from the at least one camera 173 and/or the microphone 175 may store the multimedia data at a local memory (e.g. a static memory of the media access computing device 169) and/or upload the multimedia data to one or more of the one or more databases 163.

When the multimedia has been stored, an indication of such may be generated (e.g. by the portable radio 107 and/or by the media access computing device 169 and/or by the one or more of the one or more databases 163) and transmitted to the controller 220. The indication that the multimedia data is stored successfully may indicate multimedia data stored successfully within a given time period after the event is recognized and/or after receipt of the type of the recognized event is received and/or after an arrest of the person 102 is performed and/or the recognized event is determined to be completed, and the like.

In some embodiments, the multimedia may be time-stamped and compared to the time of the recognized event; in these embodiments, successful storage of the multimedia data may include determining that multimedia data collected at the edge device, having respective timestamps within the given time period, have been successfully stored.

Furthermore, the timestamps may be used to coordinate multimedia data from different edge devices, for example when determining whether the recognized event was successfully documented.

Alternatively, the indication that the multimedia data is stored successfully may indicate multimedia data stored successfully after receipt of input data at the edge device that the recognized event is complete; for example, one or more of the video camera 114, the microphone 115, the laptop 116, the smart glasses 117, the video camera 134, the microphone 135, the at least one camera 173 and/or the microphone 175 may collect multimedia data associated with the recognized event at least up until the responder 101 has dealt with the recognized event, for example once the person 102 is subdued and/or arrested and/or handcuffed and/or calmed down, and the like, as determined by the responder 101. In other words, the responder 101 may interact with an input device of the PAN 121 to indicate that the recognized event is complete.

At a block 310, the controller 220 determines whether the multimedia data has successfully documented the recognized event. For example, the application 223 may include rules and/or criteria defining successful documentation of a recognized event based on the type of the recognized event. Alternatively, one or more of the one or more databases 163 may include such rules and/or criteria defining successful documentation of a recognized event based on the type of the recognized event which may be retrieved by the controller 220 (e.g. which may be stored in association with the code and/or the type of multimedia data associated with the recognized event).

Hence, for example, when the type of the recognized event comprises a verbal event, the recognized event is determined to be successfully documented when the multimedia data includes both video data that shows a face of a person initiating the verbal event and audio data that includes a recording of the verbal event.

Similarly, when the type of the recognized event comprises a physical interaction between an operator of the edge device (e.g. the responder 101) and the person 102, the recognized event is determined to be successfully documented when the multimedia data includes video data that includes both a recording of the physical interaction and the face of the person 102.

However, other types of events and other types of rules and/or criteria are within the scope of the present specification. For example, such successful documentation may include successfully documenting a heart rate of the responder 101 using data from the biometric sensor wristband 119.

Such a determination may occur via one or more of audio analytics, video analytics and/or one or more machine learning algorithms, as described above. For example, such audio analytics and video analytics may be components of one or more machine learning algorithms that have been "taught" to recognize events and when the recognized events have been successfully documented.

Furthermore, such a determination may be at least partially based on the timestamps of the multimedia data; for example, the reduce use of processing resources, only multimedia having timestamps within a given time period may be checked to determine whether the multimedia data documents the recognized event.

When the multimedia data has successfully documented the recognized event (e.g. a "YES" decision at the block 310), at a block 312, the controller 220 controls the edge device to provide a notification of successful documentation of the recognized event.

For example, when the controller 220 is at the analytical computing device 162, the controller 220 may transmit a control command, to provide such a notification, to one or more edge devices in the PAN 121 and/or the VAN 138 that is configured to provide notifications (and/or control another device in the PAN 121 and/or the VAN 138). Such notification may be one or more of: graphical, textual and audible. For example, a display screen of one or more of the laptop 116, the portable radio 107, and the RSM video capture device 108 (e.g. the display screen 110) may be controlled to provide a graphical or textual notification indicating successful documentation of the recognized event. Similarly, the headphones 120, and/or a speaker of one or more of the laptop 116, the portable radio 107, the RSM video capture device 108 may be controlled to provide an audio notification indicating that successful documentation of the recognized event.

Furthermore, the edge device at which the notification is provided may be one or more of the devices 200 at which the method 300 is being implemented. For example, the method 300 may be implemented at the portable radio 107 (e.g. the device 200 may comprise the portable radio 107) and the portable radio 107 may also be controlled (e.g. by the controller 220 of the portable radio 107) to provide the notification.

However, when the multimedia data has not successfully documented the recognized event (e.g. a "NO" decision at the block 310), at a block 314, the controller 220 may control the edge device to continue to collect further multimedia data until the further multimedia data has successfully documented one or more of the recognized event and further recognized events. For example, when the face of the person 102 is not in video data collected by one or more of the one or more of the video camera 114, the laptop 116, the smart glasses 117, the video camera 134, and/or the at least one camera 173, video data may continue to be collected until the face of the person 102 is in the video data. Similarly, further recognized events may be determined, assuming the block 302 to the block 310 continues to be implemented in parallel with the remaining blocks of the method 300 and the video data may continue to be collected until the face of the person 102 is in the video data associated with either the recognized event or any further recognized events.

Alternatively, and/or in addition to the block 314, when the multimedia data has not successfully documented the recognized event (e.g. a "NO" decision at the block 310), at a block 316 the controller 220 may control the edge device to provide a recommendation of an action to improve collection of the further multimedia data to better document one or more of the recognized event and the further recognized events. For example, when the face of the person 102 is in the video data, the controller 220 may control a device associated with the responder 101, that is configured to provide notifications, to provide a recommendation to move to better collect the face of the person 102 in video data.

Alternatively, and/or in addition to one or more of the block 314 and the block 316, the controller 220 may repeat at least a portion of the method 300 until a "YES" decision occurs at the block 310 and the block 312 is implemented. In some of these embodiments, a further event may be recognized in the multimedia data received at the controller 220, for example when a previously recognized verbal event escalates into a physical interaction (e.g. the person 102 may have initially been merely verbally threatening the responder 101 and the person 102 may escalate such verbal threatening to a physical interaction).

Attention is next directed to FIG. 4 to FIG. 10 which depict example embodiments of the method 300. In FIG. 4 to FIG. 10 it is assumed that the controller 220 of the analytical computing device 162 is implementing the method 300. Furthermore, each of FIG. 4 to FIG. 10 is substantially similar to FIG. 1 with like elements having like numbers.

Figure 4:
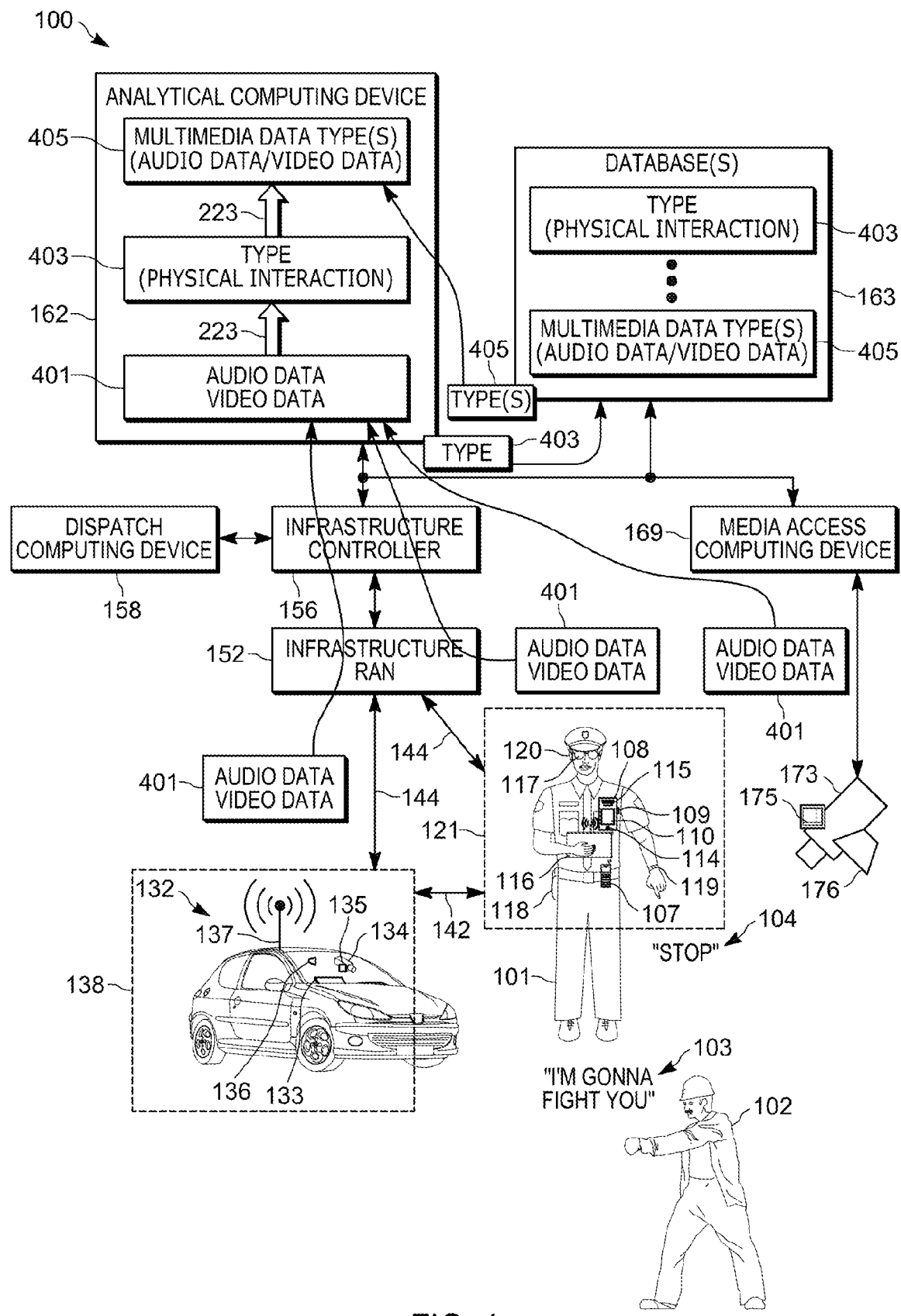
FIG. 4 depicts an analytical computing device of the system of FIG. 1 receiving multimedia data and determining a type of recognized event as well as multimedia data types to be collected to document the recognized event in accordance with some embodiments.

Attention is directed to FIG. 4 which depicts an example embodiment of the block 302 and block 304 of the method 300. In particular, in FIG. 4, multimedia data 401 is being received at the analytical computing device 162 (and/or the controller 220 of the device 200) from each of the PAN 121, the VAN 138 and the media access computing device 169. However, the multimedia data 401 may be received from one or more of the PAN 121, the VAN 138 and the media access computing device 169. For example, the multimedia data 401 may be streamed to the analytical computing device 162 and/or periodically transmitted to the analytical computing device 162 by a device of the PAN 121 and/or the VAN 138 and/or the media access computing device 169.

The multimedia data 401 generally comprises audio data and video data from corresponding microphones and video capture devices of the PAN 121, the VAN 138 and the media access computing device 169, including, but not limited to, one or more of: the video camera 114, the microphone 115, the laptop 116, the smart glasses 117, the video camera 134, the microphone 135, the video camera 173 and the microphone 175. However, the multimedia data 401 may comprise data from other sensors, such as the biometric sensor wristband 119.

Furthermore, while the multimedia data 401 is depicted as including both audio data and video data, the multimedia data 401 may include only audio data or only video data. Furthermore, in some embodiments, the multimedia data 401 may be streamed to the analytical computing device 162 (or whichever device 200 is implementing the method 300).

As depicted, the multimedia data 401 is processed by the analytical computing device 162, via the application 223, to determine a type 403 of a recognized event. For example, audio analytics and/or video analytics and/or one or more machine learning algorithms may be used to analyze and/or process the multimedia data 401 to determine the type 403 of the event represented by the multimedia data 401. When one or more machine learning algorithms are used to analyze and/or process the multimedia data to determine the type 403 of the event represented by the multimedia data 401, the one or more machine learning algorithms are assumed to have been "trained" to recognize a type of such events.

As depicted in FIG. 4, the analytical computing device 162 receives the type 403 of the recognized event, at the block 302 of the method 300, by receiving the multimedia data 401 and determining the type 403 of the recognized event from the multimedia data 401. The type 403 may comprise a code associated with the recognized event as described above.

Alternatively, the type 403 of the recognized event may be determined, as described above, by an edge device, for example, of the PAN 121 and/or the VAN 138, and/or by the media access computing device 169; in such embodiments, audio analytics and/or video analytics and/or one or more machine learning algorithms at an edge device, and/or the media access computing device 169, may be used to analyze and/or process the multimedia data 401 to determine the type 403 of the event represented by the multimedia data 401 and transmit the type 403 to the analytical computing device 162. Hence, in these embodiments, at the block 302, the analytical computing device 162 receives the type 403 of the recognized event from an edge device and/or the media access computing device 169, and the like. As described above, the type 403 may comprise an alphanumeric code and the like.

Also depicted in FIG. 4, the analytical computing device 162 (and/or the controller 220 of the device 200) determines (e.g. at the block 304 of the method 300) one or more multimedia data types 405 for collection to document the recognized event, for example using the application 223 and/or by transmitting the type 403 of the recognized event to the one or more databases 163 (e.g. in a query) and receiving the associated one or more multimedia data types 405 from the one or more databases 163 (e.g. in a response to the query). When the type 403 comprises a code, and the like, the code may be used to determine the associated one or more multimedia data types 405, for example using a lookup table, and the like, stored at the one or more databases 163. As depicted the association between the types 403, 405 at the one or more databases 163 is represented by a dashed line therebetween.

Alternatively, one or more machine learning algorithms of the application 223 may be "trained" to determine one or more multimedia data types 405 to be collected when the type 403 of the recognized event is received and/or determined.

As depicted, the type 403 of the recognized event comprises a "Physical Interaction" and the type 405 of multimedia data to collect includes audio data and video data.

Figure 5:
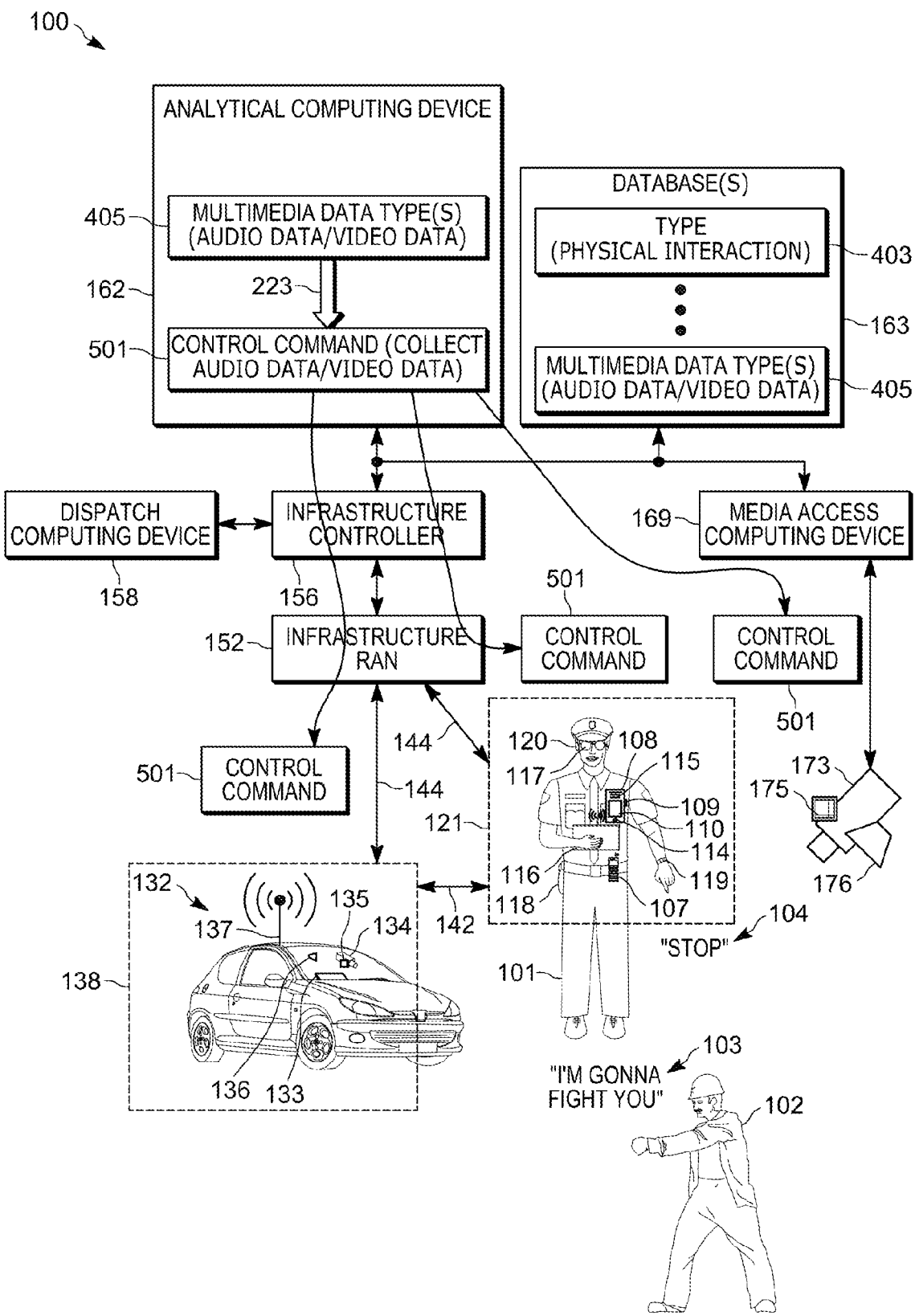
FIG. 5 depicts the analytical computing device causing an edge device to collect multimedia data of the one or more multimedia data types in accordance with some embodiments.
Figure 6:
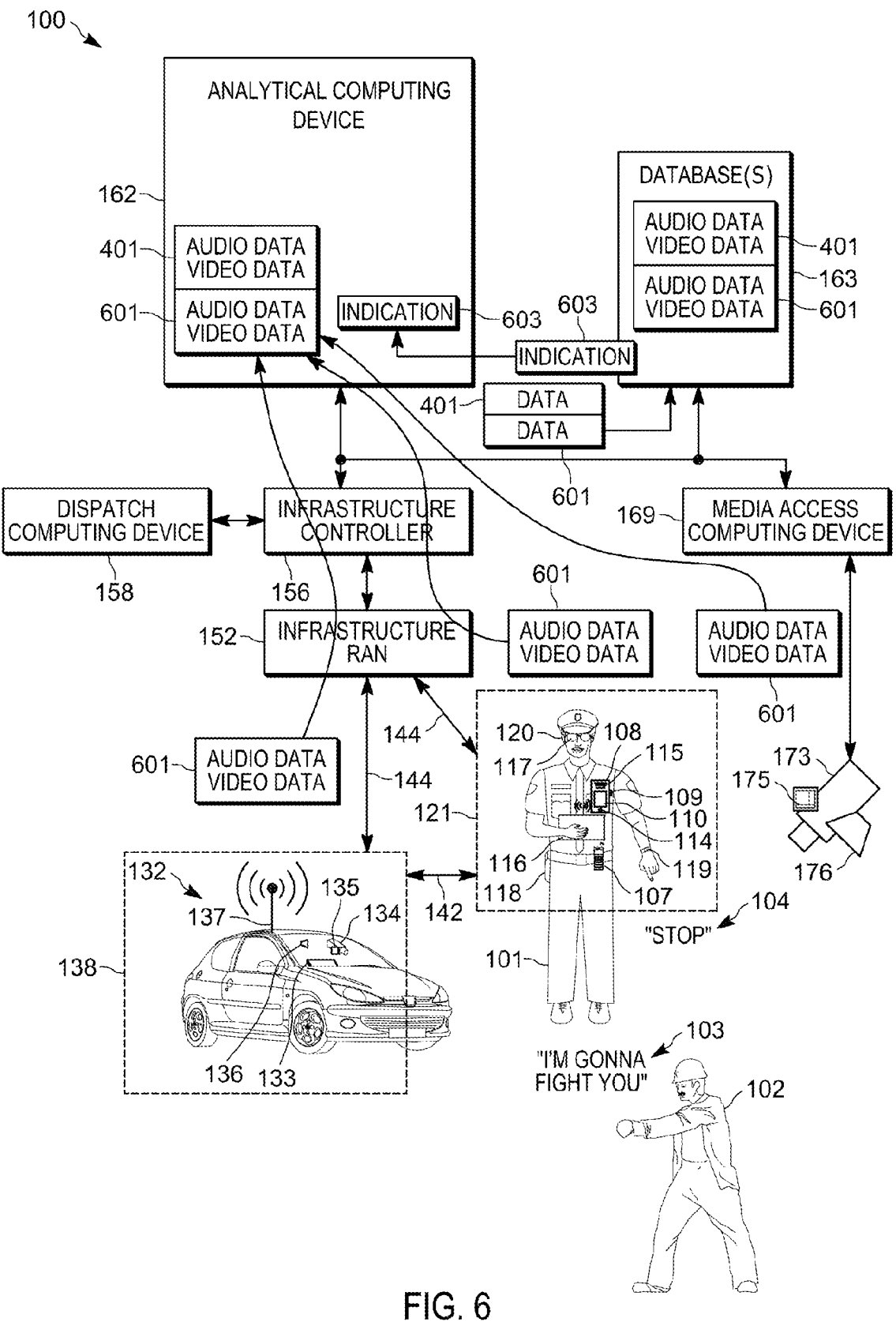
FIG. 6 depicts the analytical computing receiving the multimedia data of the one or more multimedia data types and further depicts the multimedia data of the one or more multimedia data types being stored in accordance with some embodiments.

Attention is next directed to FIG. 5 and FIG. 6 which depicts an example embodiment of the block 306 of the method 300. In particular, in FIG. 5, the analytical computing device 162 (and/or the controller 220 of the device 200) is causing the edge device (e.g. from which the multimedia data 401 and/or the type 403 is received) to collect multimedia data of the one or more multimedia data types 405. For example, the analytical computing device 162 may transmit a control command 501 to edge devices, and/or the media access computing device 169, from which the multimedia data 401 and/or the type 403 is received to cause one or more edge devices to collect multimedia data of the one or more multimedia data types 405 (e.g. at the PAN 121 and/or the VAN 138 and/or the media access computing device 169).

When the one or more multimedia data types 405 include audio data and/or video data (as depicted), the control command 501 causes the one or more edge devices (and/or the media access computing device 169) to collect the corresponding audio data and/or video data. The one or more multimedia data types 405 to be collected may be the same or different as multimedia data types of the multimedia data 401. When different, the control command 501 may cause the one or more edge devices (and/or the media access computing device 169) receiving the control command 501 to change a mode of multimedia data collection; for example, when the multimedia data 401 being collected and/or streamed to the analytical computing device 162 was only audio data and/or only video data, the control command 501 causes the edge device to change a mode to collect both audio data and video data.

Furthermore, when the multimedia data 401 is received at only one of the edge devices at a location and/or an event is recognized in multimedia data 401 from only one edge device at a location, the block 306 of the method 300 may include causing one or more further edge devices at the location to collect multimedia data of the one or more multimedia data types 405. For example, when the event is recognized only at an edge device of the PAN 121, the analytical computing device 162 may cause edge devices at the VAN 138 and edge devices controlled by the media access computing device 169 to collect multimedia data of the one or more multimedia data types 405 using the control command 501. Such embodiments assume that the analytical computing device 162 (and/or the device 200) has access to locations of the edge devices of the PAN 121 and/or the VAN 138, which may be provided periodically to the analytical computing device 162 by the edge devices of the PAN 121 and/or the VAN 138 either directly or via another device (e.g. the dispatch computing device 158); such embodiments assume that the analytical computing device 162 (and/or the device 200) has access to locations of the edge devices controlled by the media access computing device 169, which may be stored in the one or more databases 163.

Attention is next directed to FIG. 6 in which edge devices of the PAN 121, the VAN 138 and the media access computing device 169 are collecting multimedia data 601 of the one or more multimedia data types 405 in response to receiving the control command 501 (e.g. as an aspect of the block 306 of the method 300). As depicted, the multimedia data 601 of the one or more multimedia data types 405 is transmitted to the analytical computing device 162 and transmitted to the one or more databases 163 for storage, along with the multimedia data 401. Alternatively, respective multimedia data 401, 601 collected by each edge deice may be stored at memories associated with each edge device. Once at least the multimedia data 601 is stored, the one or more databases 163 may transmit an indication 603 that the multimedia data 601 has been stored successfully.

Put another way, causing an edge device to collect multimedia data of the one or more multimedia data types 405 may causes the edge device to transmit the multimedia data 401, 601 to a storage device (such as one or more of the one or more databases 163). Similarly, the indication 603 that the multimedia data 401, 601 has been stored successfully may be received (e.g. at the analytical computing device 162) from a storage device (such as one or more of the one or more databases 163).

The multimedia data 401, 601 may be provided to the one or more databases 163 by the edge devices and/or the media access computing device 169 and/or the analytical computing device 162, and the indication 603 may be provided to the analytical computing device 162 (and/or the device 200) directly by the one or more databases 163 (as depicted); alternatively, the indication 603 may be provided by the edge devices, and/or the media access computing device 169, from which the multimedia data 401, 601 was received and the indication 603 may be provided to the analytical computing device 162 (and/or the device 200) by the edge devices and/or the media access computing device 169.

Furthermore, when the multimedia data 401, 601 from a plurality of edge devices is stored, an indication 603 may be provided for successful storage of each of the multimedia data 401, 601 from each of the plurality of edge devices.

Furthermore, the multimedia data 401, 601 from each of the edge devices may be coordinated via timestamps of the multimedia data 401, 601 such that the multimedia data 401, 601 collected from different edge devices at same times and/or similar times may be used to determine whether the recognized event is documented successfully.

Hence, for example the analytical computing device 162 (and/or the device 200) may be further configured to: cause one or more further edge devices at the location (e.g. of an edge device at which a recognized event is occurring) to collect multimedia data of the one or more multimedia data types 405; and check that the multimedia data 401, 601 collected from the edge device and the one or more further edge devices documents the recognized event at least based on timestamps of the multimedia data 401, 601.

For example, when an event is recognized in multimedia data from one edge device at a location, the analytical computing device 162 (and/or the device 200) may cause further edge devices at the location to collect multimedia data of the one or more multimedia data types 405, and coordinate multimedia data from the edge devices using timestamps of the multimedia data.

Figure 7:
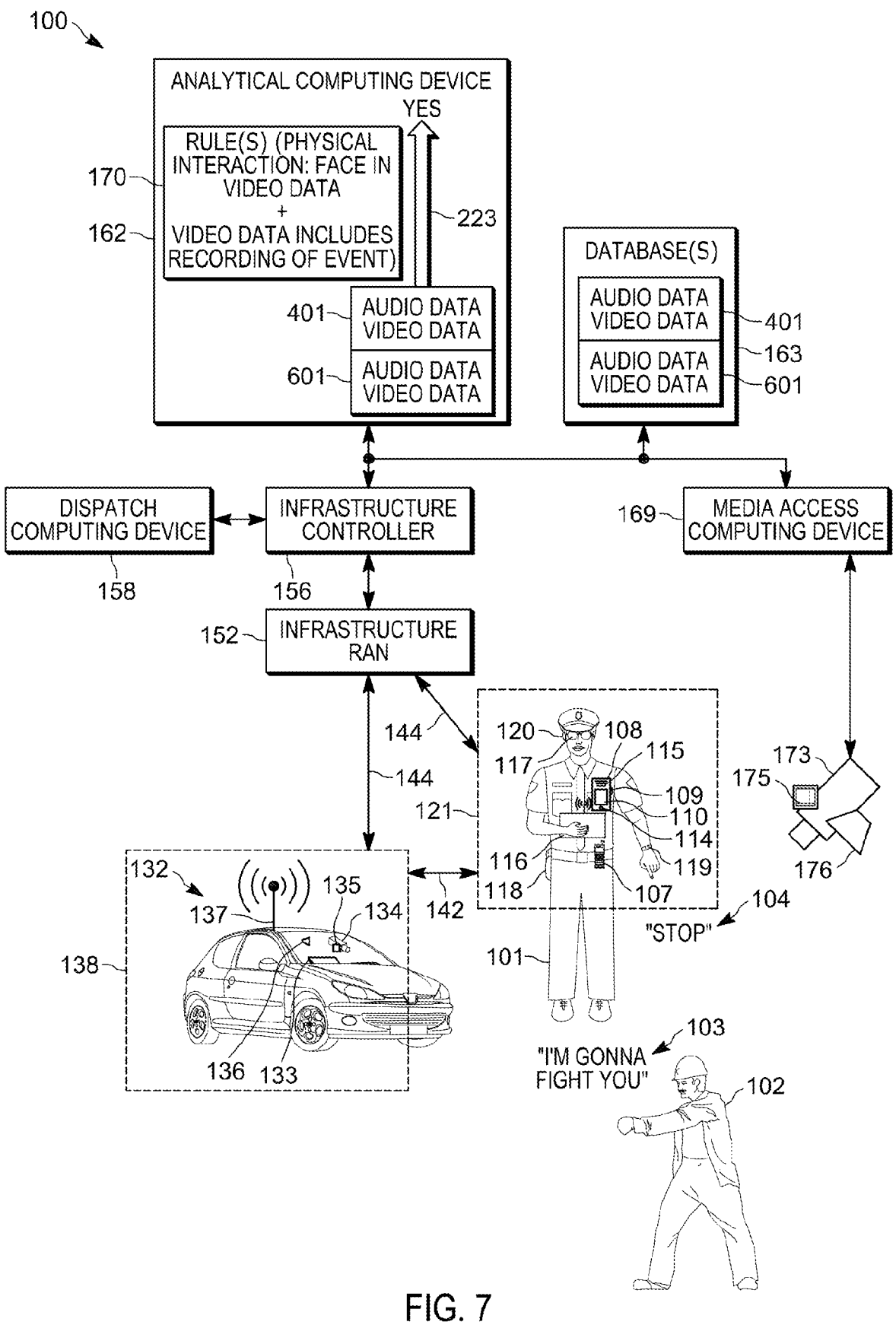
FIG. 7 depicts the analytical computing device determining that the recognized event has been successfully documented in accordance with some embodiments.

Attention is next directed to FIG. 7 which depict an example embodiment of the block 310 of the method 300. In particular, in FIG. 7, the analytical computing device 162 (and/or the controller 220 of the device 200) is determining whether the multimedia data 401, 601 has successfully documented the recognized event, for example by applying one or more one or more of audio analytics, video analytics and machine learning algorithms of the application 223 to the multimedia data 401, 601.

In depicted example embodiments, the determining whether the multimedia data 401, 601 has successfully documented the recognized event comprises: comparing the multimedia data 401, 601 against one or more rules 701 defining successful documentation based on the type 403 of the recognized event.

For example (not depicted, the one or more rules 701 may include, but is not limited to: when the type of the recognized event comprises a verbal event (e.g. when the person 102 is verbally assault the responder 101 without physically attempting to assault the responder 101), the recognized event may be determined to be successfully documented when the multimedia data 401, 601 includes both video data that shows a face of the person 102 initiating the verbal event and audio data that includes a recording of the verbal event.

In another example (as depicted), the one or more rules 701 may include, but is not limited to: when the type of the recognized event comprises a physical interaction between an operator of the edge device (e.g. the responder 101) and the person 102, the recognized event is determined to be successfully documented when the multimedia data 401, 601 includes video data that includes both a recording of the physical interaction and the face of the person 102.

Figure 8:
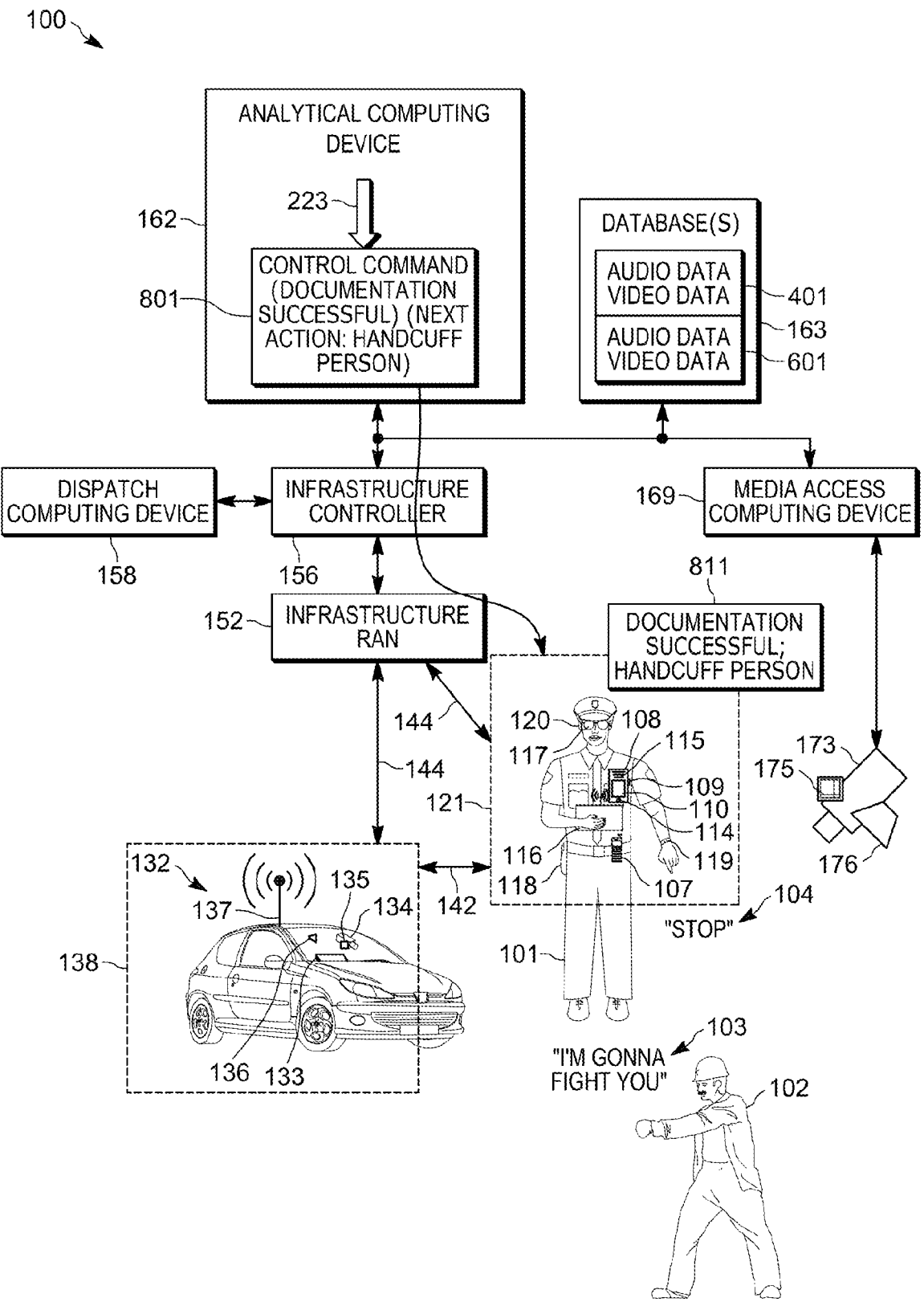
FIG. 8 depicts the analytical computing device controlling the edge device to provide a notification of successful documentation of the recognized event in accordance with some embodiments.

As depicted, it is assumed that the multimedia data 401, 601 includes video data that includes both a recording of the physical interaction and the face of the person 102 and hence the analytical computing device 162 determines "YES" (and the like) the multimedia data 401, 601 has successfully documented the recognized event (e.g. a "YES" decision at the block 310), Attention is next directed to FIG. 8 which depict an example embodiment of the block 312 of the method 300. In particular, in FIG. 8, the analytical computing device 162 (and/or the controller 220 of the device 200) is controlling an edge device of the PAN 121 to provide a notification of successful documentation of the recognized event, for example by transmitting a control command 801 to one or more edge devices of the PAN 121 that is configured to provide notifications and/or control another device in the PAN 121 to provide notifications. Alternatively, the control command 801 could be transmitted to a device of the VAN 138. As depicted, the control command 801 includes text "Documentation Successful".

Receipt of the control command 801 at the one or more edge devices of the PAN 121 (e.g. the portable radio 107) causes a notification 811 of the successful documentation of the recognized event be provided at one or more edge devices of the PAN 121 as one or more of a graphical, textual and audible notification. As depicted, the notification 811 is provided at one or more of the devices of the PAN 121 indicating "Documentation Successful" (e.g. the text in the control command 801). For example, a display screen of one or more of the laptop 116, the portable radio 107, and the RSM video capture device 108 (e.g. the display screen 110) may be controlled to provide the notification 811 indicating successful documentation of the recognized event in a graphical and/or textual format. Similarly, the headphones 120, and/or a speaker of one or more of the laptop 116, the portable radio 107, the RSM video capture device 108 may be controlled to provide the notification 811 in an audio format (e.g. by converting the text "Documentation Successful" to sound using, for example, a text-to-speech component of the application 223).

Also depicted in FIG. 8, the analytical computing device 162 (and/or the device 200), when the multimedia data 401, 601 has successfully documented the recognized event, may determine a next action to be initiated by an operator of the edge device (e.g. the responder 101) in response to the recognized event, wherein the notification 811 of the successful documentation of the recognized event includes an associated indication of the next action. For example, as depicted, the next action comprises "Handcuff Person", which is included as text in the control command 801, the text "Handcuff Person" being graphically and/or textually and/or audibly included in the notification 811.

For example, one or more machine learning algorithms of the application 223 may be "taught" to determine a next action that may occur when the recognized event of the type 403 has been documented successfully and/or a next action that may occur when the recognized event of the type 403 has been documented successfully may be stored in the one or more databases 163 and retrieved by the analytical computing device 162. In particular, the next action may be based on one or more policies of a first service entity with which the responder 101 is associated; for example, such a policy may indicate (e.g. in a format stored as data in the one or more databases 163) that when a person physically threatens a responder, and the like, the responder may handcuff the person.

Figure 9:
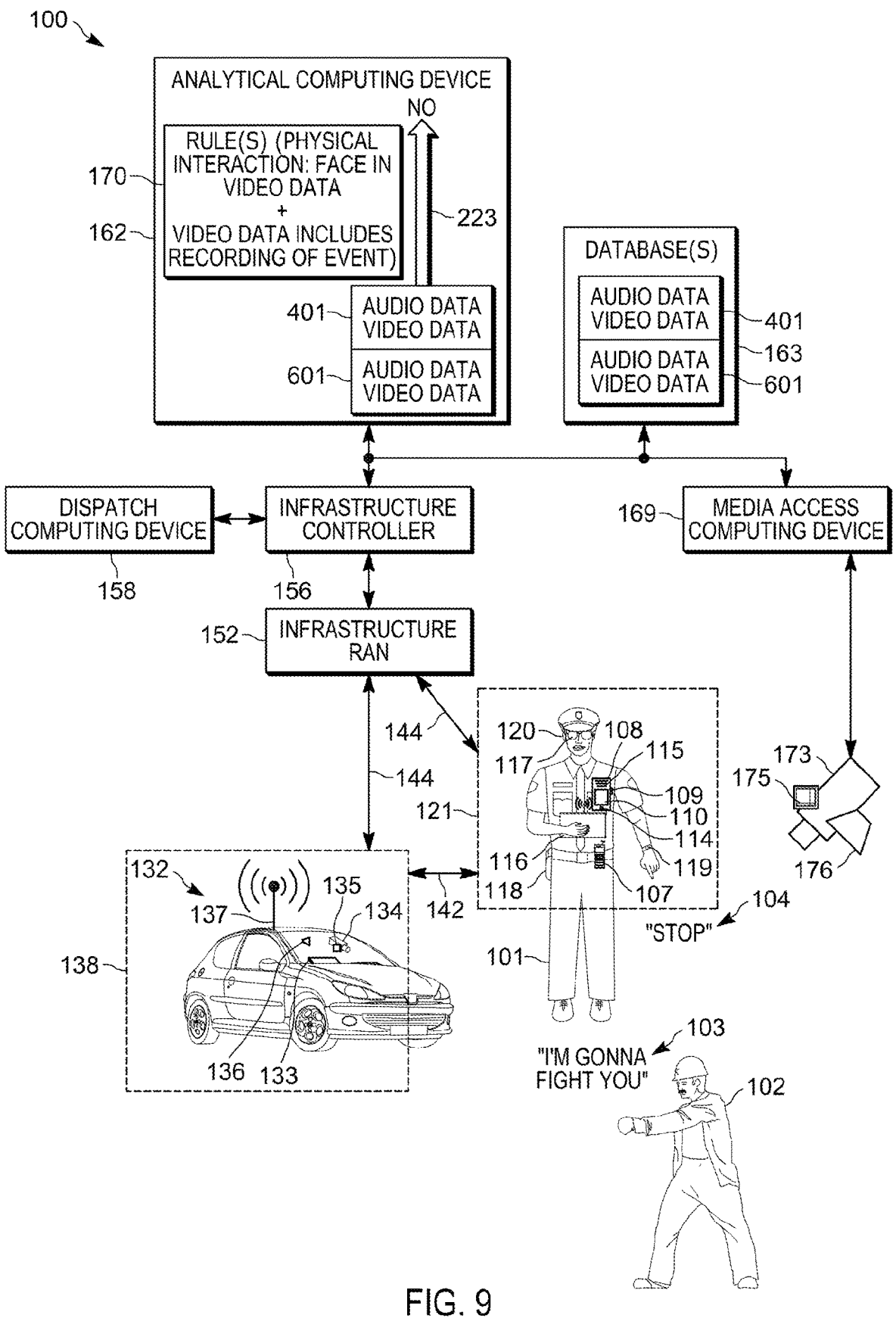
FIG. 9 depicts the analytical computing device determining that the recognized event has not been successfully documented in accordance with some embodiments.
Figure 10:
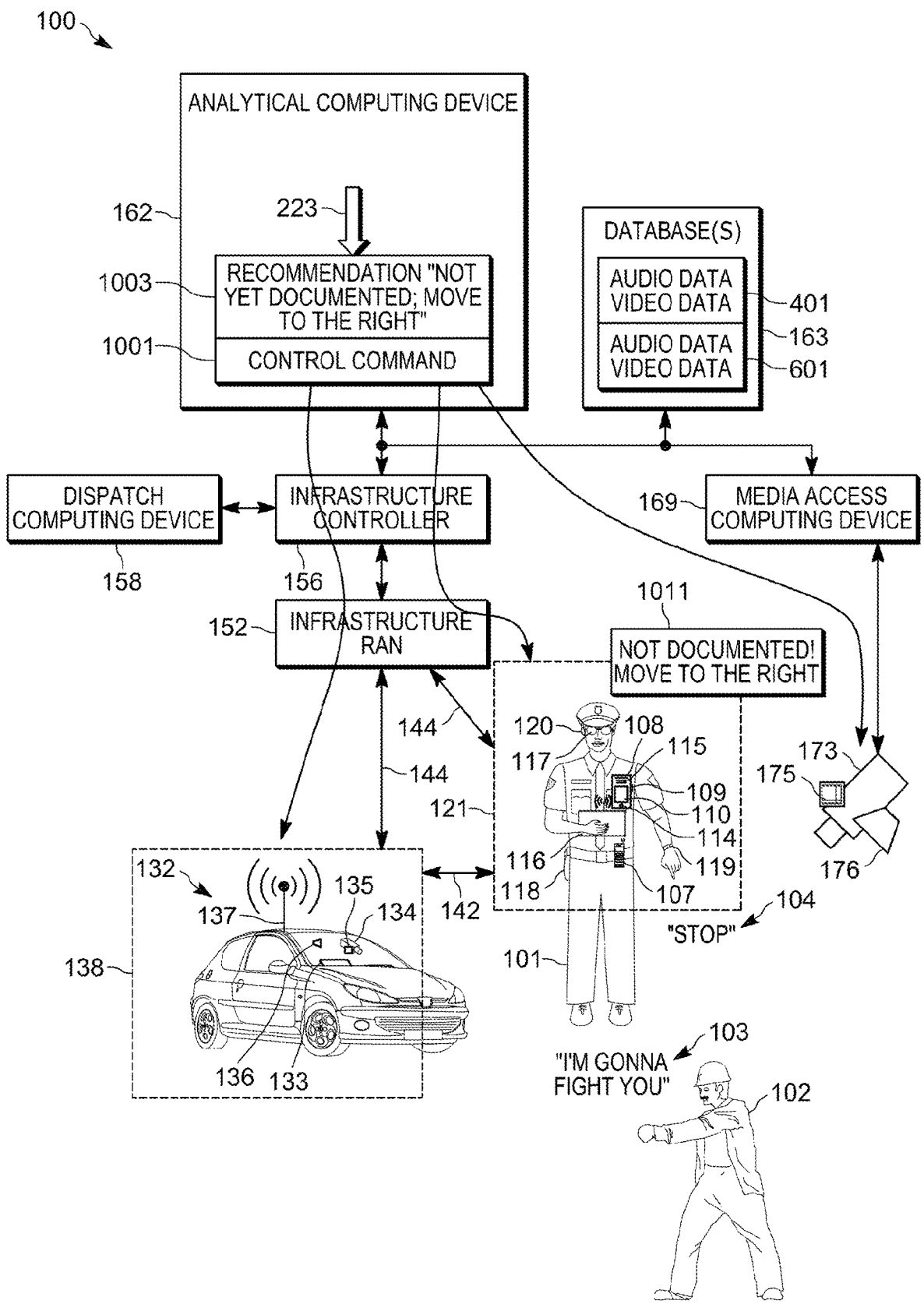
FIG. 10 depicts the analytical computing device controlling the edge device to provide a recommendation of an action to improve collection of further multimedia data to better document one or more of the recognized event and a further recognized events in accordance with some embodiments.

Attention is next directed to FIG. 9 and FIG. 10 which depict an example alternative embodiment of the block 310 of the method 300, as well as example embodiments of the block 314 and the block 316 of the method 300.

In particular, in FIG. 9, which is substantially similar to FIG. 7, the analytical computing device 162 (and/or the controller 220 of the device 200) is determining whether the multimedia data 401, 601 has successfully documented the recognized event, for example by applying one or more one or more of audio analytics, video analytics and machine learning algorithms of the application 223 to the multimedia data 401, 601 in combination with the one or more rules 701.

However, in contrast to FIG. 7, in FIG. 9 the analytical computing device 162 is determining that the multimedia data 401, 601 has not successfully documented the recognized event (e.g. a "NO" decision at the block 310). For example, the multimedia data 401, 601 may not include one or more of the face of the person 102 in video data and the video data may not include a recording of the recognized event (e.g. while the event may be recognized, the event may not be adequately documented in the video data to provide evidence of the event; for example, the person 102 throwing punches may be blurry and the like in the video data, and/or the person 102 may be partially blocked by objects between the responder 101 and the person 102).

Hence, in particular, in FIG. 10, the analytical computing device 162 (and/or the controller 220 of the device 200) may, when the multimedia data has not successfully documented the recognized event, one or more of: control (e.g. at the block 314 of the method 300) an edge device to continue to collect further multimedia data until the further multimedia data has successfully documented one or more of the recognized event and further recognized events; and, control (e.g. at the block 316 of the method 300) the edge device to provide a recommendation of an action to improve collection of the further multimedia data to better document one or more of the recognized event and the further recognized events.

For example, as depicted, the analytical computing device 162 may control (e.g. at the block 314 of the method 300) an edge device to continue to collect further multimedia data by generating a control command 1001 (which is similar to the control command 501), and transmitting the control command 1001 to the edge devices. However, the control command 1001 may be optional as the edge devices may continue to collect data at least until the "YES" decision occurs at the block 310 of the method 300 without the use of a further control command 1001. Regardless, the edge devices may continue to collect multimedia data at least until the recognized event, and/or a further recognized event (e.g. an event recognized in further multimedia data) is successfully documented. In other words, the edge devices may continue to collect multimedia data at least until the recognized even is successfully documented and/or a further recognized event is successfully documented.

Alternatively, and/or in addition to the block 314 of the method 300, as also depicted in FIG. 10, the analytical computing device 162 may control (e.g. at the block 316 of the method 300) an edge device (e.g. of the PAN 121) to provide a recommendation of an action to improve collection of the further multimedia data to better document one or more of the recognized event and the further recognized events. For example, the one or more machine learning algorithms of the application 223 may be "taught" to provide recommendations on improving documentation of a recognized event. As depicted, the one or more machine learning algorithms of the application 223 may analyze the video data received in the multimedia data 601 (and/or the multimedia data 401) and determine that if the responder 101 were to move to the right, camera devices in the PAN 121 may better capture the face of the person 102.

Hence, the recommendation 1003 includes text "Not Yet Documented; Move To The Right", which may be transmitted to an edge device of the PAN 121 similar to the control command 801, and provided as a notification 1011 in a manner similar to the notification 811. However, the recommendation 1003 may include one or more of: a recommendation that the responder 101 move in a given direction; a recommendation that the responder 101 move a camera and/or a microphone, and the like, in a given direction; a recommendation that the responder 101 adjust an angle of a camera and/or a microphone, and the like, in a given direction; a recommendation that the responder 101 adjust a field of view of a camera and/or a microphone, and the like, in a given direction. However, any suitable recommendation is within the scope of the present specification.

The recommendation 1003 may be incorporated into the control command 1001, when present, and/or provided separately from the control command 1001. Alternatively, at least the text "Not Yet Documented" may be provided in the control command 1001 (e.g. when the recommendation 1003 is not provided), to generate the notification 1011 (with or without the text indicating the action to improve collection of the further multimedia data).

Furthermore, the system 100 may be further configured to provide feedback to the machine learning algorithms being used to implement the method 300. For example, the outcome of one or more of the notifications 811, 1011 may be provided to the machine learning algorithms to better "teach" the machine learning algorithms how to implement the method 300. Such feedback may be provided to the device 200 in the form of sensor data and/or audio data and/or video data from the PAN 121, the VAN 138, and the like, and/or in the form of an incident report that resulted from the responder 101 interacting with the person 102.

Such feedback may further include an identifier of the event, as well as whether or not the event was successfully documented, for example assuming that the responder 101 (or another person) identified the event in an incident report, and the like and/or manually checked the multimedia data 401, 601 stored in the one or more databases 163, and the like.

Such feedback may be logged in a repository, such as one or more of the one or more databases 163, so that the data may be used as evidence of a public safety incident of the responder 101 interacting with the person 102, for example for use if charges are laid against the person 102 and/or in a court case. The feedback as logged in a repository may also be used as a source for providing the feedback to the machine learning algorithms.

Provided herein is a device, system and method for controlling a communication device to provide notifications of successful documentation of events. Implementation of the method at one or more computing devices may prevent a responder from engaging further technical resources to stop and/or interact with a person.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

In this document, language of "at least one of X, Y, and Z" and "one or more of X, Y and Z" may be construed as X only, Y only, Z only, or any combination of two or more items X, Y, and Z (e.g., XYZ, XY, YZ, XZ, and the like). Similar logic may be applied for two or more items in any occurrence of "at least one . . . " and "one or more . . . " language.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

We claim:

1. A computing device comprising:
a communications unit and a controller configured to:
receive, using the communications unit, a type of a recognized event occurring at a location of an edge device;
determine, based on the type of the recognized event, one or more multimedia data types for collection to document the recognized event;
cause, using the communications unit, the edge device to collect multimedia data of the one or more multimedia data types;
receive, using the communications unit, an indication that the multimedia data has been stored successfully;
determine whether the multimedia data has successfully documented the recognized event; and
when the multimedia data has successfully documented the recognized event, controlling, using the communications unit, the edge device to provide a notification of successful documentation of the recognized event,
wherein:
when the type of the recognized event comprises a verbal event, the controller determines the recognized event to be successfully documented when the multimedia data includes both video data that shows a face of a person initiating the verbal event and audio data that includes a recording of the verbal event; and
when the type of the recognized event comprises a physical interaction between an operator of the edge device and the person, the controller determines the recognized event to be successfully when the multimedia data includes video data that includes both a recording of the physical interaction and the face of the person.

2. The computing device of claim 1, wherein the controller is further configured to:
cause, using the communications unit, one or more further edge devices at the location to collect multimedia data of the one or more multimedia data types.

3. The computing device of claim 1, wherein the controller is further configured to:
cause, using the communications unit, one or more further edge devices at the location to collect multimedia data of the one or more multimedia data types; and
check that the multimedia data collected from the edge device and the one or more further edge devices documents the recognized event at least based on timestamps of the multimedia data.

4. The computing device of claim 1, wherein the one or more multimedia data types to collect include one or more of the audio data and the video data, the audio data being collected at least when the type of the recognized event comprises the verbal event, and the video data being collected at least when the type of the recognized event comprises the physical interaction between the operator of the edge device and the person.

5. The computing device of claim 1, wherein the controller is further configured to determine whether the multimedia data has successfully documented the recognized event by: comparing the multimedia data against one or more rules defining successful documentation based on the type of the recognized event.

6. The computing device of claim 1, wherein the controller is further configured to, when the multimedia data has successfully documented the recognized event:
determining, at the one or more computing devices, a next action to be initiated by the operator of the edge device in response to the recognized event, wherein the notification of the successful documentation of the recognized event includes an associated indication of the next action.

7. The computing device of claim 1, wherein the controller is further configured to cause the edge device to collect multimedia data of the one or more multimedia data types by causing the edge device to transmit the multimedia data to a storage device.

8. The computing device of claim 1, wherein the indication that the multimedia data has been stored successfully is received from a storage device.

9. The computing device of claim 1, wherein the controller is further configured to, when the multimedia data has not successfully documented the recognized event, one or more of:
control, using the communications unit, the edge device to continue to collect further multimedia data until the further multimedia data has successfully documented one or more of the recognized event and further recognized events; and
control, using the communications unit, the edge device to provide a recommendation of an action to improve collection of the further multimedia data to better document one or more of the recognized event and the further recognized events.

10. A method comprising:
receiving, at one or more computing devices, a type of a recognized event occurring at a location of an edge device;
determining, at the one or more computing devices, based on the type of the recognized event, one or more multimedia data types for collection to document the recognized event;
causing, using the one or more computing devices, the edge device to collect multimedia data of the one or more multimedia data types;
receiving, at the one or more computing devices, an indication that the multimedia data has been stored successfully;
determining, at the one or more computing devices, whether the multimedia data has successfully documented the recognized event; and
when the multimedia data has successfully documented the recognized event, controlling, using the one or more computing devices, the edge device to provide a notification of successful documentation of the recognized event,
wherein:
when the type of the recognized event comprises a verbal event, the recognized event is determined to be successfully documented when the multimedia data includes both video data that shows a face of a person initiating the verbal event and audio data that includes a recording of the verbal event; and
when the type of the recognized event comprises a physical interaction between an operator of the edge device and the person, the recognized event is determined to be successfully documented when the multimedia data includes video data that includes both a recording of the physical interaction and the face of the person.

11. The method of claim 10, further comprising:
causing, using the one or more computing devices, one or more further edge devices at the location to collect multimedia data of the one or more multimedia data types.

12. The method of claim 10, further comprising:
causing, using the one or more computing devices, one or more further edge devices at the location to collect multimedia data of the one or more multimedia data types; and
checking that the multimedia data collected from the edge device and the one or more further edge devices documents the recognized event at least based on timestamps of the multimedia data.

13. The method of claim 10, wherein the one or more multimedia data types to collect include one or more of the audio data and the video data, the audio data being collected at least when the type of the recognized event comprises the verbal event, and the video data being collected at least when the type of the recognized event comprises the physical interaction between the operator of the edge device and the person.

14. The method of claim 10, wherein determining, at the one or more computing devices, whether the multimedia data has successfully documented the recognized event comprises: comparing the multimedia data against one or more rules defining successful documentation based on the type of the recognized event.

15. The method of claim 10, further comprising, when the multimedia data has successfully documented the recognized event:
determining, at the one or more computing devices, a next action to be initiated by the operator of the edge device in response to the recognized event, wherein the notification of the successful documentation of the recognized event includes an associated indication of the next action.

16. The method of claim 10, wherein causing the edge device to collect multimedia data of the one or more multimedia data types causes the edge device to transmit the multimedia data to a storage device.

17. The method of claim 10, wherein the indication that the multimedia data has been stored successfully is received from a storage device.

18. The method of claim 10, further comprising, when the multimedia data has not successfully documented the recognized event, one or more of:
controlling, using the one or more computing devices, the edge device to continue to collect further multimedia data until the further multimedia data has successfully documented one or more of the recognized event and further recognized events; and
controlling, using the one or more computing devices, the edge device to provide a recommendation of an action to improve collection of the further multimedia data to better document one or more of the recognized event and the further recognized events.

\* \* \* \* \*